(12) United States Patent
Hatley et al.

(10) Patent No.: US 8,723,450 B2
(45) Date of Patent: May 13, 2014

(54) SYSTEM AND METHOD FOR CONTROLLING THE SPECTRAL CONTENT OF AN OUTPUT OF A LIGHT FIXTURE

(75) Inventors: Troy Bryan Hatley, Lodi, WI (US); Timothy George Robbins, Lodi, WI (US); Mike Wood, Austin, TX (US); Dennis W. Varian, Madison, WI (US)

(73) Assignee: Electronics Theatre Controls, Inc., Middleton, WI (US)

( * ) Notice: Subject to any disclaimer, the term of this patent is extended or adjusted under 35 U.S.C. 154(b) by 619 days.

(21) Appl. No.: 13/004,931

(22) Filed: Jan. 12, 2011

(65) Prior Publication Data

US 2012/0176042 A1    Jul. 12, 2012

(51) Int. Cl.
*H05B 37/02* (2006.01)

(52) U.S. Cl.
USPC .......................... 315/312; 315/314; 315/317

(58) Field of Classification Search
USPC .......... 362/227, 231, 230; 315/312, 315, 314, 315/317, 318, 319
See application file for complete search history.

(56) References Cited

U.S. PATENT DOCUMENTS

| | | | |
|---|---|---|---|
| 5,350,977 A | 9/1994 | Hamamoto et al. | |
| 5,636,303 A | 6/1997 | Che et al. | |
| 6,510,995 B2 | 1/2003 | Muthu et al. | |
| 6,572,977 B1 | 6/2003 | Pavelka et al. | |
| 6,576,881 B2 | 6/2003 | Muthu et al. | |
| 6,603,271 B2 | 8/2003 | Noh | |
| 6,683,423 B2 | 1/2004 | Cunningham | |
| 6,888,322 B2 | 5/2005 | Dowling et al. | |
| 6,967,447 B2 | 11/2005 | Lim et al. | |
| 7,012,382 B2 | 3/2006 | Cheang et al. | |
| 7,023,543 B2 | 4/2006 | Cunningham | |
| 7,030,574 B2 | 4/2006 | Lim et al. | |
| 7,067,995 B2 | 6/2006 | Gunter et al. | |

(Continued)

FOREIGN PATENT DOCUMENTS

| DE | 102007059130 | 6/2009 |
|---|---|---|
| JP | 20098110715 | 5/2009 |

(Continued)

OTHER PUBLICATIONS

United States Patent Office Notice of Allowance for U.S. Appl. No. 12/898,127 dated Oct. 24, 2012 (6 pages).

(Continued)

*Primary Examiner* — David H Vu
(74) *Attorney, Agent, or Firm* — Michael Best & Friedrich LLP

(57) ABSTRACT

Systems and methods for controlling the spectral content of the output of a light fixture. The method of one embodiment includes driving the output of a light fixture to a target color and controlling the spectral content of the output of the light fixture. For example, a desired color is inputted using a color control methodology. A set of light source output intensity values that produce the desired color are identified, and then the light sources are driven to the identified output intensity values. A user is able to control the spectral content of the output of the light fixture by modifying the output intensity value of one or more of the light sources. After modifying the output intensity values, the color control and matching technique is used to identify a new set of output intensity values that maintain the previous target color but incorporate the changes in spectral content.

20 Claims, 21 Drawing Sheets

(56) References Cited

U.S. PATENT DOCUMENTS

| | | | |
|---|---|---|---|
| 7,178,941 B2 | 2/2007 | Roberge et al. |
| 7,230,222 B2 | 6/2007 | Cheng et al. |
| 7,233,831 B2 | 6/2007 | Blackwell |
| 7,288,902 B1 | 10/2007 | Melanson |
| 7,319,298 B2 | 1/2008 | Jungwirth et al. |
| 7,348,949 B2 | 3/2008 | Lee et al. |
| 7,354,172 B2 | 4/2008 | Chemel et al. |
| 7,358,961 B2 | 4/2008 | Zwanenburg |
| 7,387,405 B2 | 6/2008 | Ducharme et al. |
| 7,394,210 B2 | 7/2008 | Ashdown |
| 7,513,671 B2 | 4/2009 | Ng et al. |
| 7,521,872 B2 | 4/2009 | Bruning |
| 7,560,677 B2 | 7/2009 | Lyons et al. |
| 7,573,209 B2 | 8/2009 | Ashdown et al. |
| 7,598,684 B2 | 10/2009 | Lys et al. |
| 7,598,686 B2 | 10/2009 | Lys et al. |
| 7,604,378 B2 | 10/2009 | Wolf et al. |
| 7,619,193 B2 | 11/2009 | Deurenberg |
| 7,619,370 B2 | 11/2009 | Chemel et al. |
| 7,638,956 B2 | 12/2009 | Liu et al. |
| 7,710,369 B2 | 5/2010 | Dowling |
| 7,718,942 B2 | 5/2010 | Lim et al. |
| 7,759,854 B2 | 7/2010 | Miller et al. |
| 7,759,882 B2 | 7/2010 | Korcharz et al. |
| 7,767,948 B2 | 8/2010 | May et al. |
| 7,781,979 B2 | 8/2010 | Lys |
| 7,786,678 B2 | 8/2010 | Kurt et al. |
| 7,868,562 B2 | 1/2011 | Salsbury et al. |
| 8,022,632 B2 | 9/2011 | Schulz et al. |
| 8,084,948 B2 | 12/2011 | Van Der Veen et al. |
| 2002/0171373 A1 | 11/2002 | Muthu |
| 2004/0212320 A1 | 10/2004 | Dowling et al. |
| 2005/0062446 A1* | 3/2005 | Ashdown ................ 315/324 |
| 2005/0151489 A1 | 7/2005 | Lys et al. |
| 2005/0218838 A1 | 10/2005 | Lys |
| 2005/0218897 A1 | 10/2005 | Schulz et al. |
| 2006/0049782 A1 | 3/2006 | Vornsand et al. |
| 2006/0139914 A1 | 6/2006 | Yoganandan et al. |
| 2006/0187236 A1 | 8/2006 | Runnels et al. |
| 2006/0226795 A1 | 10/2006 | Walter et al. |
| 2006/0226956 A1 | 10/2006 | Young et al. |
| 2006/0237636 A1 | 10/2006 | Lyons et al. |
| 2006/0290710 A1 | 12/2006 | Zwanenburg |
| 2007/0076014 A1 | 4/2007 | De Vaan |
| 2007/0235639 A1 | 10/2007 | Rains, Jr. |
| 2008/0203945 A1 | 8/2008 | Deurenberg et al. |
| 2008/0218095 A1 | 9/2008 | Erhardt |
| 2008/0246419 A1 | 10/2008 | Deurenberg |
| 2009/0174332 A1 | 7/2009 | Sejkora |
| 2009/0315476 A1 | 12/2009 | Baaijens |
| 2010/0002440 A1 | 1/2010 | Negley et al. |
| 2010/0027257 A1 | 2/2010 | Boonekamp et al. |
| 2010/0052560 A1 | 3/2010 | Li et al. |
| 2010/0060171 A1 | 3/2010 | Goitiandia et al. |
| 2010/0079059 A1 | 4/2010 | Roberts et al. |
| 2010/0097406 A1 | 4/2010 | Zulch |
| 2010/0097407 A1 | 4/2010 | Zulch |
| 2010/0110672 A1 | 5/2010 | Durand et al. |
| 2010/0128472 A1 | 5/2010 | Hancock et al. |
| 2010/0171444 A1 | 7/2010 | Bennette |
| 2010/0188022 A1 | 7/2010 | Gerlach et al. |
| 2010/0259175 A1 | 10/2010 | Forster et al. |
| 2011/0187290 A1* | 8/2011 | Krause ................ 315/312 |
| 2012/0081010 A1 | 4/2012 | Hatley |
| 2013/0154516 A1 | 6/2013 | Hatley et al. |

FOREIGN PATENT DOCUMENTS

| | | |
|---|---|---|
| WO | 2006/069002 | 6/2006 |
| WO | 2007/033667 | 3/2007 |
| WO | 2007083250 | 7/2007 |
| WO | 2008/006205 | 1/2008 |
| WO | 2008/068713 | 6/2008 |
| WO | 2008/072138 | 6/2008 |
| WO | 2008/078274 | 7/2008 |
| WO | 2008/142622 | 11/2008 |
| WO | 2009/024903 | 2/2009 |
| WO | 2010/080651 | 7/2010 |
| WO | 2012/081010 | 4/2012 |
| WO | 2012/096733 | 7/2012 |
| WO | 2012/096734 | 7/2012 |

OTHER PUBLICATIONS

Notification concerning informal communications with the applicant for Application No. PCT/US2011/054747 dated Oct. 10, 2012 (5 pages).
International Preliminary Report on Patentability for Application No. PCT/US2011/054747 dated Nov. 12, 2012 (21 pages).
International Preliminary Report on Patentability for Application No. PCT/US2011/063965 dated Jan. 15, 2013 (5 pages).
International Written Opinion for Application No. PCT/US2011/063961 dated Jan. 15, 2013 (7 pages).
International Search Report and Written Opinion for Applicatino No. PCT/US2011/054747 dated Mar. 15, 2012 (10 pages).
International Search Report and Written Opinion for Application No. PCT/US2011/063965 dated Feb. 28, 2012 (9 pages).
International Search Report and Written Opinion for Application No. PCT/US2011/063961 dated Apr. 27, 2012 (10 pages).
Copending U.S. Appl. No. 13/004,922, filed Jan. 12, 2011.
United States Patent Office Action for U.S. Appl. No. 12/898,127 dated Jul. 18, 2012 (7 pages).
International Preliminary Report on Patentability for Application No. PCT/US2011/063961 dated Apr. 5, 2013 (8 pages).
United States Patent Office Action for U.S. Appl. No. 13/766,827 dated May 3, 2013 (6 pages).
United States Patent Office Notice of Allowance for U.S. Appl. No. 13/004,922 dated Jul. 15, 2013 (10 pages).

* cited by examiner

SYSTEM AND METHOD FOR CONTROLLING THE SPECTRAL CONTENT OF AN OUTPUT OF A LIGHT FIXTURE

BACKGROUND

This invention relates to controlling the spectral content of an output of a light fixture.

Luminaires or light fixtures are capable of reproducing a wide gamut of colors by combining light from, for example, a plurality of light sources. For example, a convenient way of visualizing the color gamut of a light fixture is using the International Commission on Illumination ("CIE") 1931 color space chromaticity diagram 10 illustrated in FIG. 1. The CIE 1931 color space chromaticity diagram 10 is a two-dimensional representation of the colors in the visible spectrum in which each color is identified by an x-y coordinate (i.e., (x, y)). The CIE 1931 color space incorporates the use of tristimulus values that correspond to the amounts of three primary colors in a three-component additive color model that are needed to match a target color. The tristimulus values, denoted by X, Y, and Z, are derived parameters that are used to represent the human eye's response to red, green, and blue colors.

The tristimulus values are dependent on an observer's field-of-view ("FOV"). To eliminate this dependence, a standard observer is defined which corresponds to a 2° FOV. The standard observer is described numerically with respect to three color matching functions given by $\bar{x}(\lambda)$, $\bar{y}(\lambda)$, and $\bar{z}(\lambda)$, as shown graphically in diagram 15 of FIG. 2. The color matching functions are used to calculate the tristimulus values X, Y, and Z, as shown below.

$$X = \int_0^\infty I(\lambda)\bar{x}(\lambda)d\lambda, \quad \text{EQN. 1}$$

$$Y = \int_0^\infty I(\lambda)\bar{y}(\lambda)d\lambda \quad \text{EQN. 2}$$

and, $$Z = \int_0^\infty I(\lambda)\bar{z}(\lambda)d\lambda \quad \text{EQN. 3}$$

The chromaticity of a color is then defined in terms of an x-y coordinate. The Y tristimulus value is used as a measure of brightness or luminance. The x-y coordinate can be calculated as a function of the tristimulus values X, Y, and Z, as shown below in EQNS. 4-6.

$$x = \frac{X}{(X+Y+Z)}, \quad \text{EQN. 4}$$

$$y = \frac{Y}{(X+Y+Z)} \quad \text{EQN. 5}$$

and, $$z = \frac{Z}{(X+Y+Z)} = 1 - x - y \quad \text{EQN. 6}$$

The color space specified by the x-y coordinate and the Y tristimulus value, known as the CIE xyY color space, is often used to identify colors.

SUMMARY

The use of the CIE xyY color space, and particularly an x-y coordinate to identify colors, provides a consistent technique for selecting color outputs of luminaires or light fixtures. However, complex color control or targeting methodologies (e.g., hue-saturation-intensity ("HSI"), red-green-blue ("RGB"), etc.) do not translate to a consistent output across multiple fixtures or families of light fixtures, and are unable to provide a user with the ability to manually control the spectral content of an output of a light fixture.

As such, the invention provides systems and methods for automatically driving the light sources within the light fixture based on a target color to produce an output of the light fixture, as well as manually controlling the spectral content of the output of the light fixture. For example, a desired color is inputted to the light fixture using a color control methodology (e.g., HSI, RGB, etc.). A set of light source output intensity values that produce the desired color are then identified, and the light sources are driven to the identified output intensity values. A user is then able to manually control the spectral content of the output of the light fixture by modifying (i.e., increasing or decreasing) the output intensity value of one or more of the light sources. After the output intensity values have been modified, the color control and matching technique is used to identify a new set of output intensity values that maintain the previous target color and correspond to the user's desired changes in the spectral content of the output of the light fixture.

In one embodiment, the invention provides a method of controlling the output of a light fixture. The light fixture includes four or more light sources. The method includes identifying a first output value for each of the four or more light sources based on a target color, and driving the four or more light sources at the first output value for each of the four or more light sources to produce the output of the light fixture. The output of the light fixture substantially corresponds to the target color and has a first spectral content. The method also includes receiving a modification signal associated with a modification to the first output value of at least one of the four or more light sources. The modification signal corresponds to a change in the first spectral content. A second output value for each of the four or more light sources is identified based on the modification signal, and the four or more light sources are driven at the second output value for each of the four or more light sources to produce the output of the light fixture. The output of the light fixture substantially corresponds to the target color and has a second spectral content that is different than the first spectral content.

In another embodiment, the invention provides a method of controlling the output of a light fixture. The light fixture includes a first light source, a second light source, a third light source, and a fourth light source. The method includes automatically identifying, based on a target color, a first output value for the first light source, a first output value for the second light source, a first output value for the third light source, and a first output value for the fourth light source. The method also includes driving the first light source at the first output value for the first light source, the second light source at the first output value for the second light source, the third light source at the first output value for the third light source, and the fourth light source at the first output value for the fourth light source to produce the output of the light fixture. The output of the light fixture substantially corresponds to the target color and has a first spectral content. A modification signal associated with a modified first output value for the first light source is received, and the modified first output value for the first light source corresponds to a change in the first spectral content. The method also includes automatically identifying, based on the target color, a second output value for the second light source, a second output value for the third light source, and a second output value for the fourth light source. The first light source is driven based on the modified first output value for the first light source, the second light source is driven at the second output value for the second light source, the third light source is driven at the second output value for the third light source to produce the output of the light fixture, and the fourth light source is driven at the second output value for the fourth light source to produce the output of the light fixture. The output of the light fixture substantially corresponds to the target color and has a second spectral content that is different from the first spectral content.

In another embodiment, the invention provides a system for controlling the output of a light fixture. The system includes four or more light sources and a controller. The controller is configured to identify a first output value for each of the four or more light sources based on a target color, and drive the four or more light sources at the first output value for each of the four or more light sources to produce the output of the light fixture. The output of the light fixture substantially corresponds to the target color and has a first spectral content. The controller is also configured to receive a modification signal associated with a modification to the first output value of at least one of the four or more light sources. The modification signal corresponds to a change in the first spectral content. The controller is also configured to identify a second output value for each of the four or more light sources based on the modification signal, and drive the four or more light sources at the second output value for each of the four or more light sources to produce the output of the light fixture. The output of the light fixture substantially corresponds to the target color and has a second spectral content that is different than the first spectral content.

Other aspects of the invention will become apparent by consideration of the detailed description and accompanying drawings.

DETAILED DESCRIPTION

Figure 1:
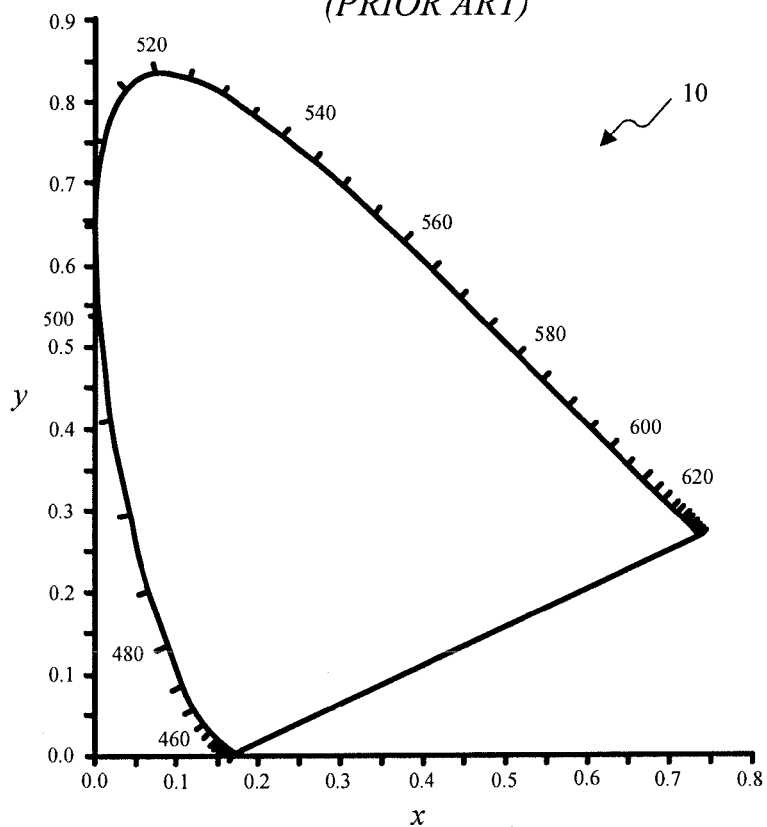
FIG. 1 is the International Commission on Illumination ("CIE") 1931 color space chromaticity diagram.
Figure 2:
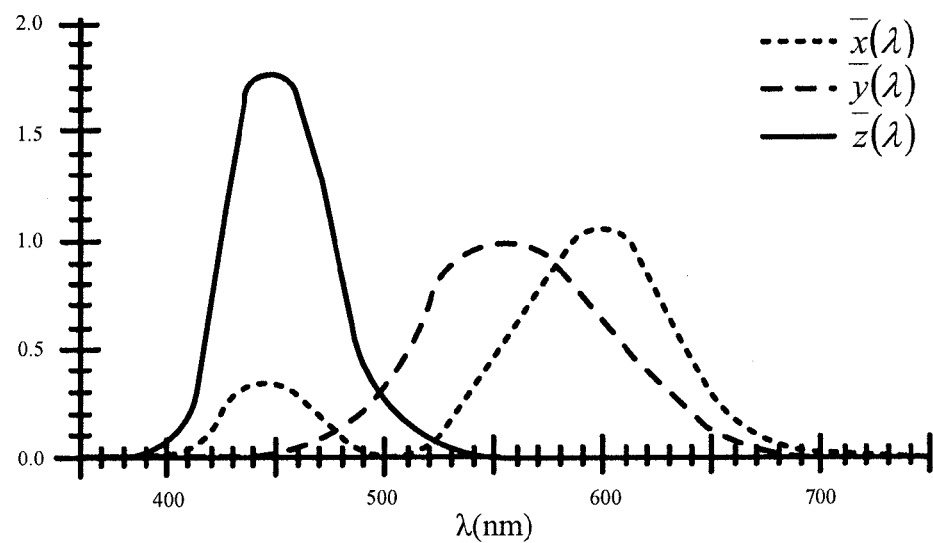
FIG. 2 illustrates the CIE 1931 XYZ color matching functions.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

The invention described herein relates to systems and methods for controlling the spectral content of an output of a light fixture. A method includes identifying a set of light source output intensity values based on a target color. The set of light source output intensity values are identified using, for example, one or more color matching and targeting techniques. A user is then able to manually modify the spectral content of the output of the light fixture by modifying the output intensity value of one or more of the light sources within the light fixture. For example, the user is able to modify the output intensity value of a light source to increase or decrease the amount of a corresponding color that is present in the output of the light fixture. Following the modification of the output intensity value, the color matching and targeting technique is used to identify a new set of output intensity values that maintain the previous target color and correspond to the user's desired changes in the spectral content of the output of the light fixture.

The invention can be implemented using a variety of color control, targeting, and matching methodologies, such as HSI, RGB, CYM, YIQ, YUV, HSV, HLS, XYS, etc. The technique described below is exemplary and corresponds to one of the variety of color targeting and matching techniques. Additionally, the invention is capable of being implemented internal to or external from a light fixture. For example, the light fixture can include sufficient memory and processing power to execute one or more programs associated with the inventive methods. Additionally or alternatively, a separate computer (e.g., a central computer, a control panel, etc.) includes sufficient memory and processing power to execute one or more programs associated with the inventive methods.

A light fixture, or a controller connected to the light fixture, uses stored spectral information for the light sources within the light fixture to determine a location for each light source within a particular color space (e.g., the CIE xyY color space). A desired output color is inputted using a complex color control methodology (e.g., hue-saturation-intensity ("HSI"), red-green-blue ("RGB"), etc.), and is also converted to a location within the color space. The separation (e.g., distance) between the desired output color location and each of the locations corresponding to the light sources is calculated to select initial control values for the light sources. The smaller the distance between a light source location and the desired output color location, the greater the initial control value. The initial control values for each light source are then individually modified by a step size value, the total output of the light fixture is calculated and converted to a location within the color space, and the separation (e.g., distance) between the light fixture output location and the desired color location is calculated. The control values for the light sources are iteratively modified until the light fixture output location is within a threshold value of the desired color output. The light sources in the light fixture are then driven to the identified control values.

The locations described herein generally relate to positions or coordinates within a color space that can be used to map colors in one, two, or three dimensional space, and allow for the consistent identification of colors. Implementations and constructions of the invention are described herein with respect to the CIE xyY color space, but other color spaces can also be used. The separations between the locations within the color space are described generally with respect to distances. However, the separations can also be based on, for example, ratios, products, sums, or differences between wavelengths, frequencies, intensities, polarizations, phases, color temperature, brightness, saturation, etc., and correspond generally to an intervening space or gap between points, values, quantities, objects, locations, and the like.

Figure 3:
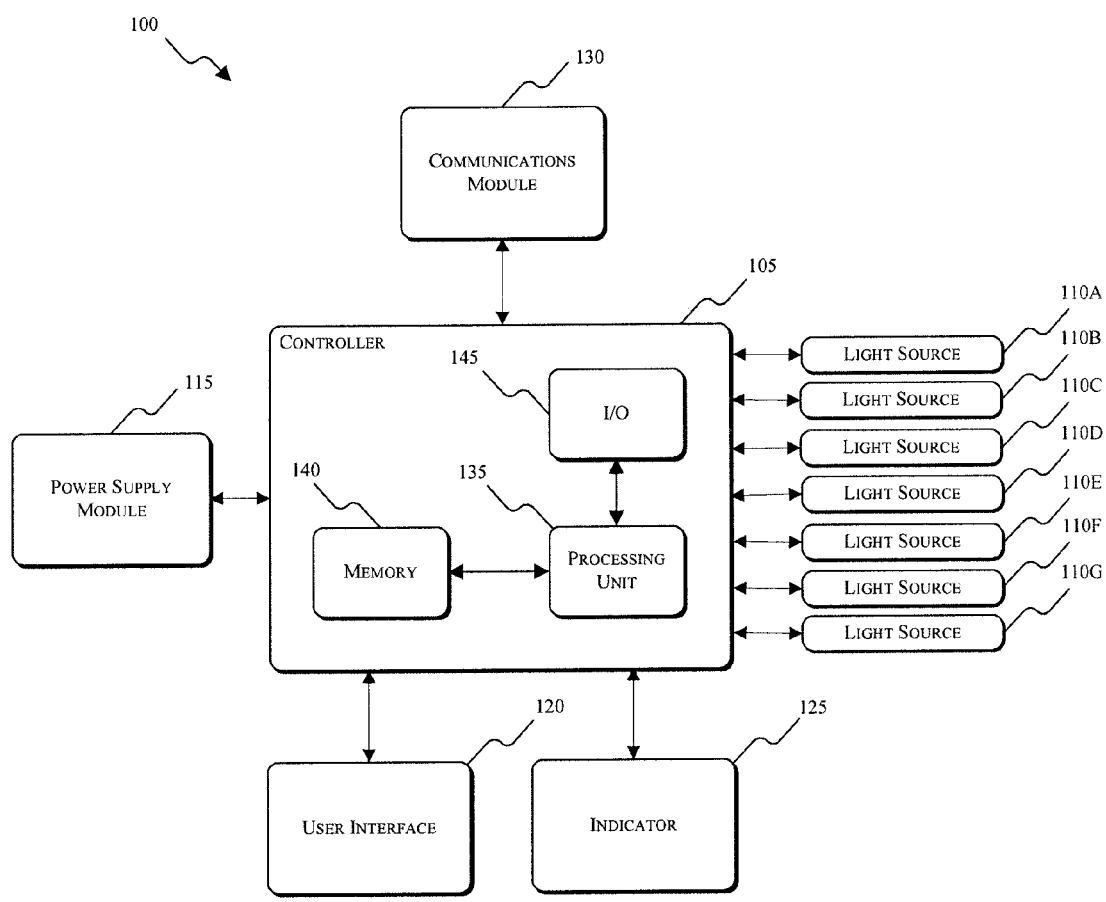
FIG. 3 is a block diagram of a light fixture.
Figure 4:
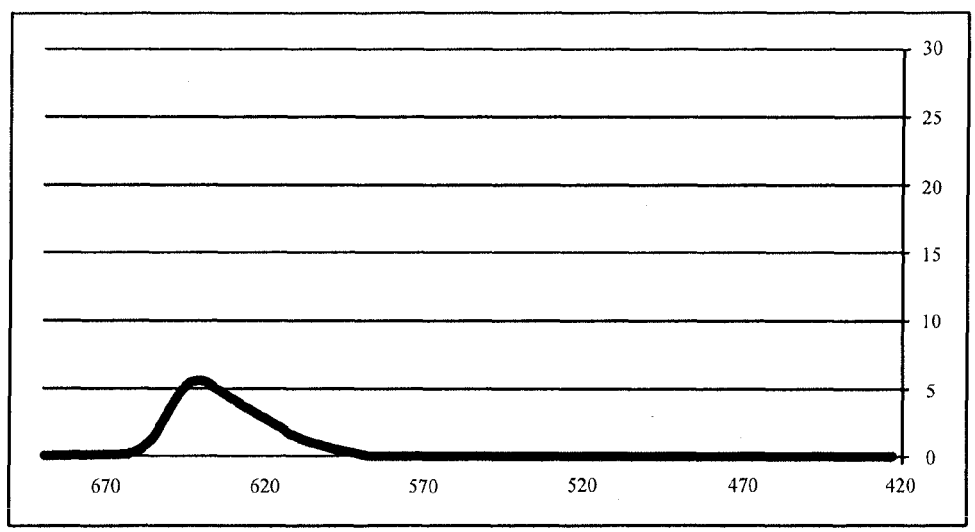
FIG. 4 illustrates an output of a red light source with respect to wavelength.
Figure 5:
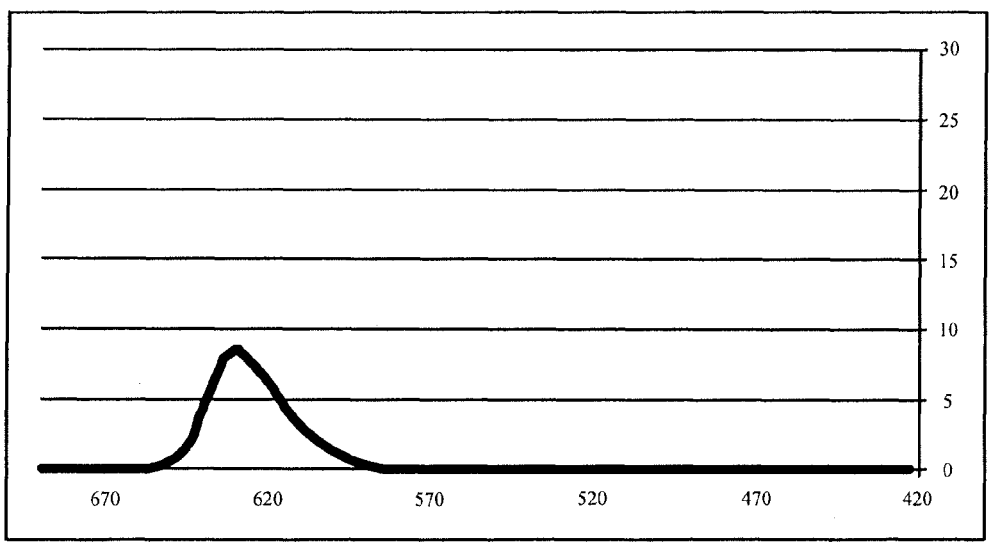
FIG. 5 illustrates an output of a red-orange light source with respect to wavelength.
Figure 6:
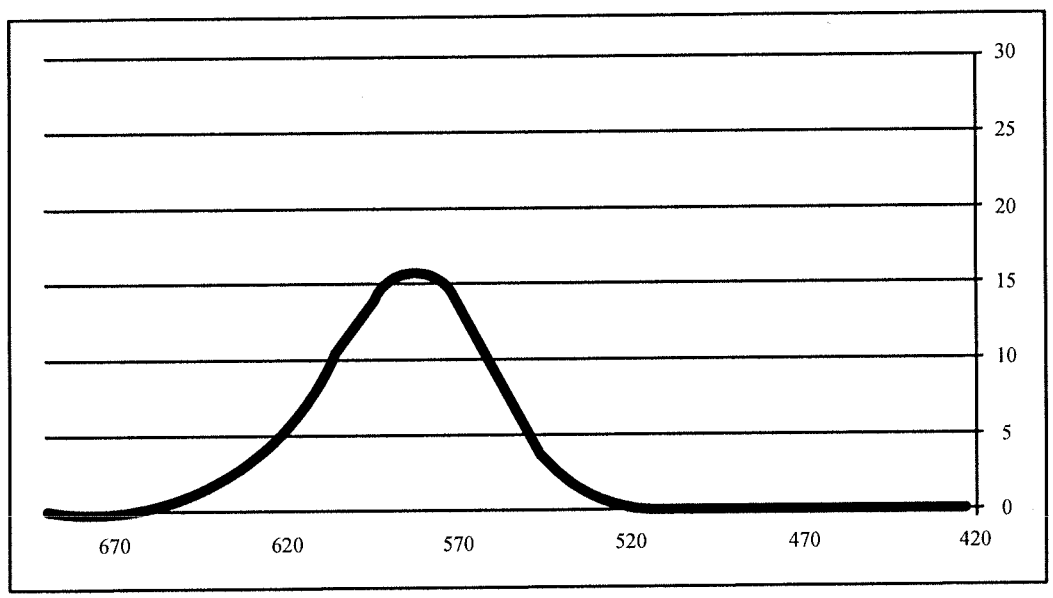
FIG. 6 illustrates an output of an amber light source with respect to wavelength.
Figure 7:
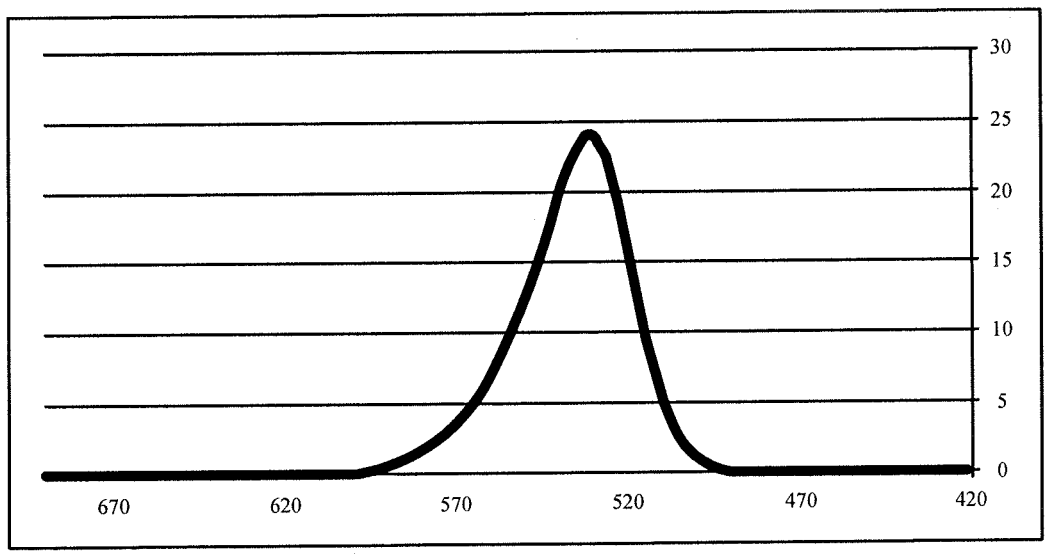
FIG. 7 illustrates an output of a green light source with respect to wavelength.
Figure 8:
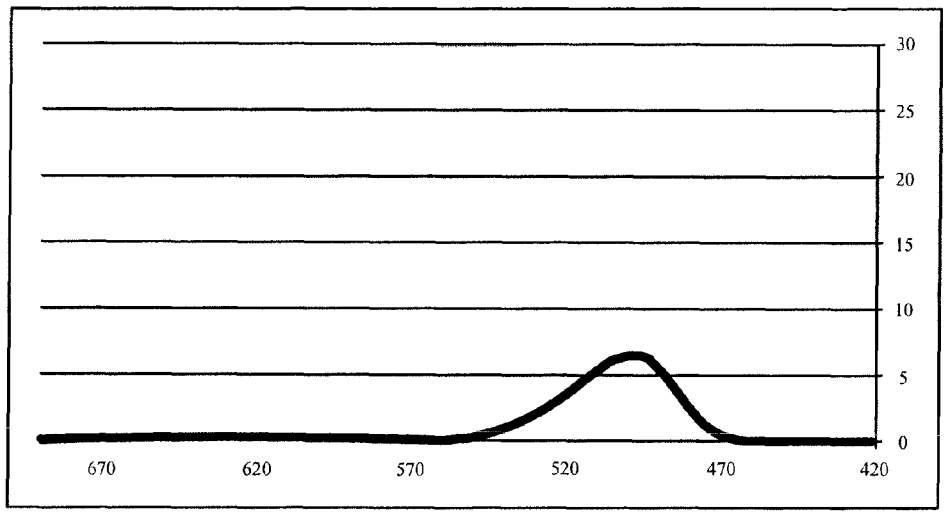
FIG. 8 illustrates an output of a cyan light source with respect to wavelength.
Figure 9:
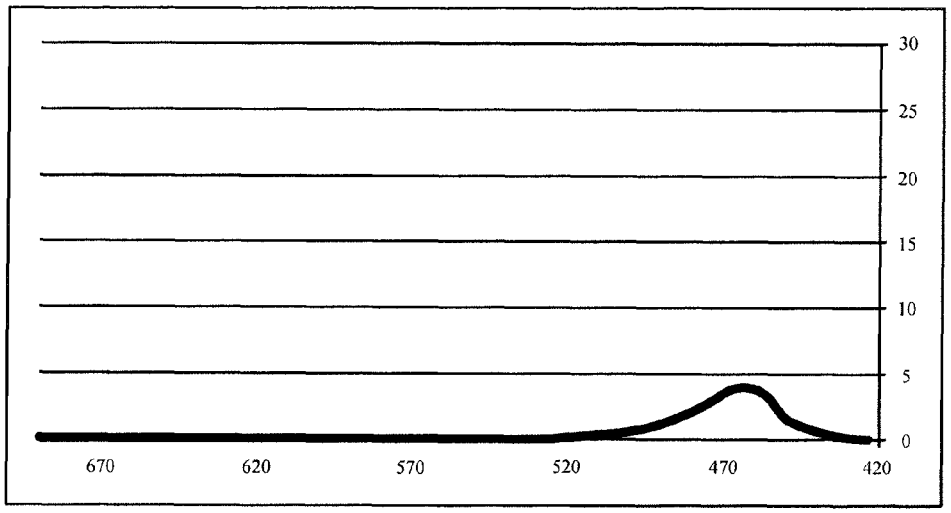
FIG. 9 illustrates an output of a blue light source with respect to wavelength.
Figure 10:
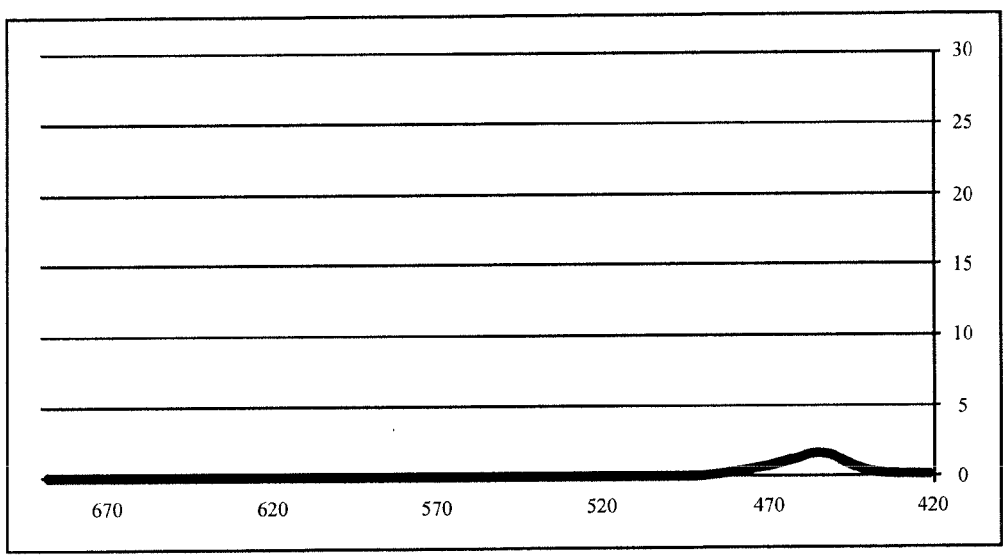
FIG. 10 illustrates an output of an indigo light source with respect to wavelength.

In some implementations, light fixtures are used in, for example, a theatre, a hall, an auditorium, a studio, or the like. Each light fixture 100 includes, among other things, a controller 105, a plurality of light sources 110A-110G, a power supply module 115, a user interface 120, one or more indicators 125, and a communications module 130, as shown in FIG. 3. In the illustrated construction, the light fixture 100 includes seven light sources 110A-110G. Each light source is configured to generate light at a specific wavelength or range of wavelengths. For example, the light sources 110A-110G generate light corresponding to the colors red, red-orange, amber, green, cyan, blue, and indigo. In other constructions, light sources that generate different colors are used (e.g., violet, yellow, etc.).

The controller 105 includes, or is connected to an external device (e.g., a computer, a controller, etc.) that includes, combinations of software and hardware that are operable to, among other things, control the operation of one or more of the light fixtures, control the output of each of the light sources 110A-110G, and activate the one or more indicators 125 (e.g., LEDs or a liquid crystal display ("LCD")). In one construction, the controller 105 or external device includes a printed circuit board ("PCB") (not shown) that is populated with a plurality of electrical and electronic components that provide power, operational control, and protection to the light fixtures. In some constructions, the PCB includes, for example, a processing unit 135 (e.g., a microprocessor, a microcontroller, or another suitable programmable device), a memory 140, and a bus. The bus connects various components of the PCB including the memory 140 to the processing unit 135. The memory 140 includes, for example, a read-only memory ("ROM"), a random access memory ("RAM"), an electrically erasable programmable read-only memory ("EEPROM"), a flash memory, a hard disk, or another suitable magnetic, optical, physical, or electronic memory device. The processing unit 135 is connected to the memory 140 and executes software that is capable of being stored in the RAM (e.g., during execution), the ROM (e.g., on a generally permanent basis), or another non-transitory computer readable medium such as another memory or a disc. Additionally or alternatively, the memory 140 is included in the processing unit 135. The controller 105 also includes an input/output ("I/O") system 145 that includes routines for transferring information between components within the controller 105 and other components of the light fixtures or system. For example, the communications module 130 is configured to provide communication between the light fixture 100 and one or more additional light fixtures or another control device within a lighting system.

Software included in the implementation of the controller 105 is stored in the memory 140. The software includes, for example, firmware, one or more applications, program data, one or more program modules, and other executable instructions. The controller 105 is configured to retrieve from memory and execute, among other things, instructions related to the control processes and methods described below. For example, the controller 105 is configured to execute instructions retrieved from the memory 140 for performing a mathematical transformation of a control value to a value that is required to drive the light sources 110A-110G to produce a desired color. In other constructions, the controller 105 or external device includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, or voltage regulation. For descriptive purposes, the PCB and the electrical components populated on the PCB are collectively referred to as the controller 105.

The user interface 120 is included to control the light fixture 100 or the operation of a lighting system as a whole. The user interface 120 is operably coupled to the controller 105 to control, for example, the output of the light sources 110A-110G. The user interface 120 can include any combination of digital and analog input devices required to achieve a desired level of control for the system. For example, the user interface 120 can include a computer having a display and input devices, a touch-screen display, a plurality of knobs, dials, switches, buttons, faders, or the like. In some constructions, the user interface is separated from the light fixture 100.

The power supply module 115 supplies a nominal AC or DC voltage to the light fixture 100 or system of light fixtures. The power supply module 115 is powered by mains power having nominal line voltages between, for example, 100V and 240V AC and frequencies of approximately 50-60 Hz. The power supply module 115 is also configured to supply lower voltages to operate circuits and components within the light fixture 100. In other constructions, the light fixture 100 is powered by one or more batteries or battery packs.

As illustrated in FIG. 3, the controller 105 is connected to light sources 110A-110G. In other constructions, the controller 105 is connected to, for example, red, green, and blue ("RGB") light sources, red, green, blue, and amber ("RGBA") light sources, red, green, blue, and white ("RGBW") light sources, or other combinations of light sources. A seven light source implementation is illustrated because it is operable to reproduce substantially the entire spectrum of visible light. In other implementations, eight or more light sources are used to further enhance the light fixtures ability to reproduce visible light.

Figure 11:
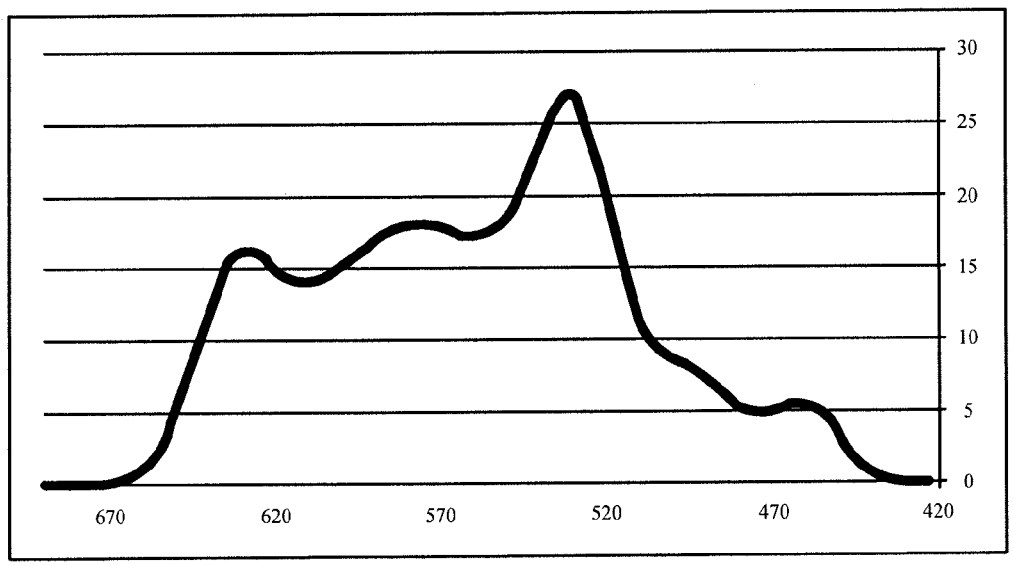
FIG. 11 illustrates a total output of a light fixture with respect to wavelength.
Figure 12:
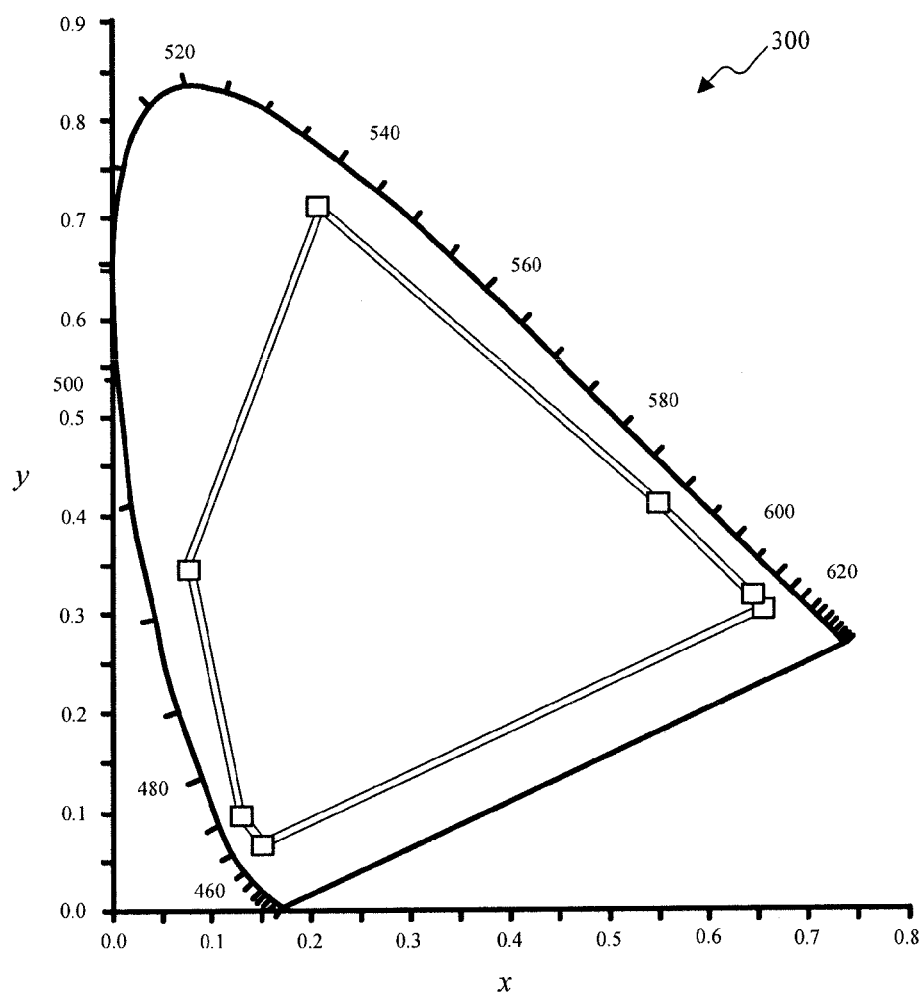
FIG. 12 illustrates a gamut of a light fixture.
Figure 13:
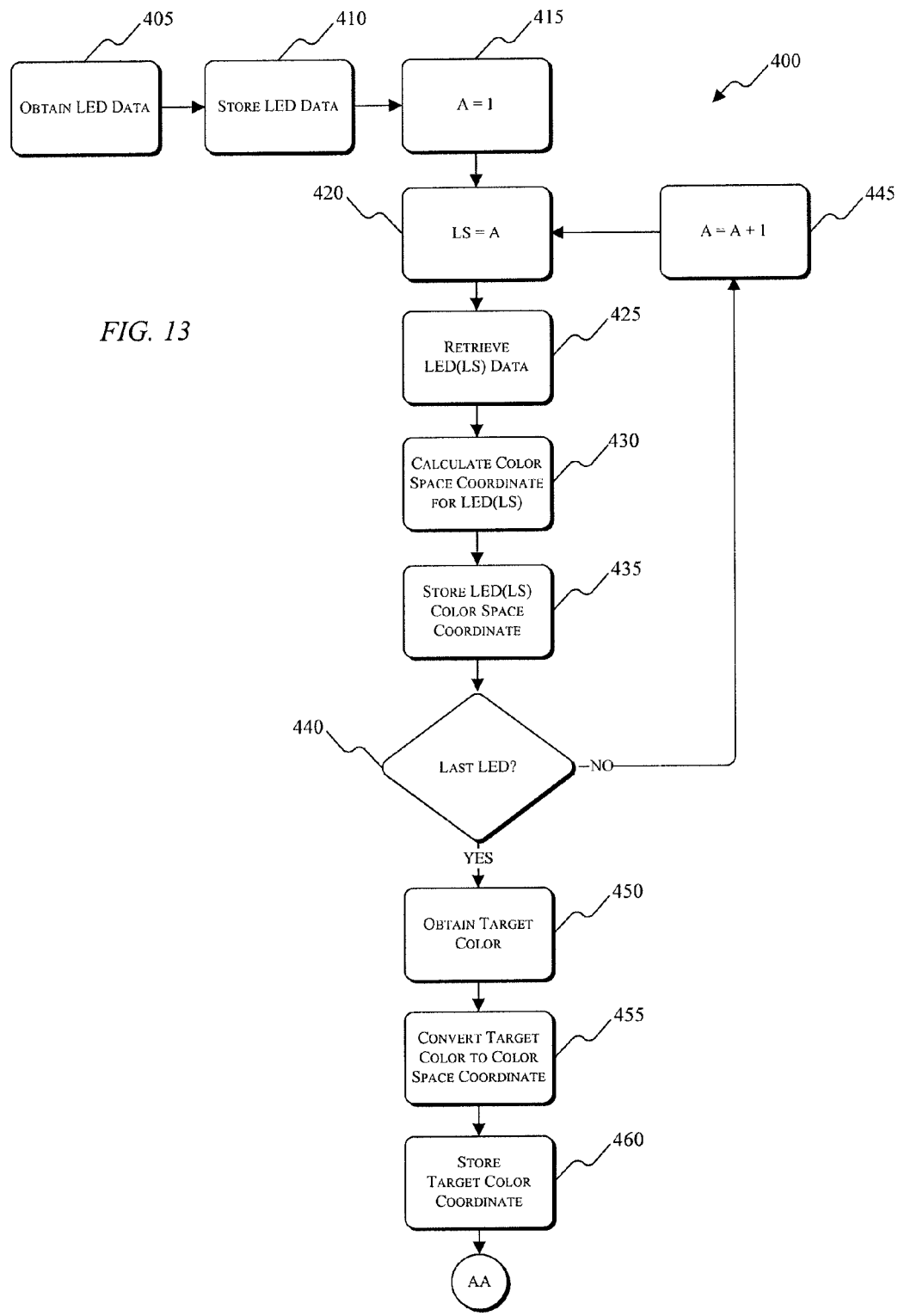
FIGS. 13-19 are a process for color creation and matching.

FIGS. 4-11 illustrate spectral data corresponding to the outputs of a variety of light sources for the light fixture having the gamut illustrated in FIG. 12. The spectral data for each of the light sources is sampled or gathered, for example, at the time of manufacture. The x-axis of each graph corresponds to a wavelength of light in nanometers ("nm"), and the y-axis of each graph corresponds to a magnitude or intensity of the output of the light source. FIGS. 4-10 correspond to a light fixture that includes seven light sources and represent the spectral output data 200 for a red light source, the spectral output data 205 for a red-orange light source, the spectral output data 210 for an amber light source, the spectral output data 215 for a green light source, the spectral output data 220 for a cyan light source, the spectral output data 225 for a blue light source, and the spectral output data 230 for a indigo light source. FIG. 11 illustrates the spectral data 235 for a resultant total output of the light fixture when the spectral output data 200-230 for each of the light sources in the light fixture is combined. The spectral data shown in FIGS. 4-11 is stored in a memory of the light fixture as a table or multiple tables of values. The values associated with the tables are accessed or retrieved to calculate an output of the light fixture without having to activate the light sources and use light sensors. Spectral data can be gathered in a similar manner for light fixtures including different numbers or colors of light sources.

FIG. 12 illustrates the available color gamut 300 for the light fixture that is represented by the spectral data in FIGS. 4-11. As such, only colors that fall within or on the illustrated color gamut polygon are reproducible by the light fixture. If a desired color is not within the available gamut, the desired color coordinate is shifted toward a white point until it is capable of being reproduced by the light fixture. The white point can be user selectable and is within the available color gamut. As described above, due to variations in the output characteristics of individual light sources within the light fixture, the spectral data is used to adjust the output intensity values of the light fixture until the output of the light fixture is within a threshold or error value. For example, the output of the light fixture is converted to a coordinate within the CIE xyY color space. The distance between the output coordinate and a desired coordinate is calculated. The calculated distance is compared to the threshold value. If the distance between the two coordinates is less than or equal to the threshold value, the light sources in the light fixture have been successfully color matched and are illuminated at the determined intensity values.

The CIE xyY color space represents x-coordinates with values between 0.0 and 0.8, and y-coordinates with values between 0.0 and 0.9. To avoid floating point calculations, 16-bit integers are used in some constructions to represent both the x-coordinate and the y-coordinate. An integer value of zero corresponds to a coordinate of 0.0, and an integer value of 32,767 corresponds to a coordinate of 1.0. Therefore, some constructions of the invention achieve a resolution of 1/32,767 or approximately 0.00003.

FIGS. 13-19 are a process 400 for color creation and matching. The process 400 begins with obtaining LED data (step 405). The LED data includes, for example, spectral data associated with the output of each of the light sources within a light fixture or light fixture. In some implementations, the LED data corresponds to the output intensities of the light sources with respect to wavelength. At step 405, the LED data can be obtained using a spectrometer or, alternatively, be retrieved from a memory. After the LED data has been obtained, the LED data is stored in either a volatile or non-volatile memory (step 410). If the LED data had already been saved to a non-volatile memory (e.g., a ROM), the LED data can be retrieved and stored in, for example, a RAM or similar memory used to store information necessary for the execution of the process 400. In some implementations, the LED data can be, for example, modified, normalized, or compensated to account for variations in the output of the light sources that result from the effects of time, temperature, etc. For example, the outputs of the light sources vary as the temperatures of the light sources vary. The outputs of the light sources also vary throughout the life of the light sources (e.g., output can decrease as the light source ages). The relationships between the outputs of the light sources and these and other conditions can be determined and stored in, for example, the memory 140. The outputs of the light sources can then be compensated for these variations by retrieving the relationships from memory and adjusting the output of the light sources accordingly. The remaining steps of the process 400 are described in an iterative manner for descriptive purposes. Various steps described herein with respect to the process 400 are capable of being executed simultaneously, in parallel, or in an order that differs from the illustrated serial and iterative manner of execution.

At step 415, a first variable, A, is initialized or set equal to one. A light source variable, LS, is then set equal to the first variable, A, (step 420) to select the first of the plurality of light sources within the light fixture. The LED data associated with the first LED is then retrieved from memory (step 425). The retrieved LED data is used to calculate a color space coordinate for the first LED within the specified color space (e.g., the CIE xyY color space) (step 430), as described above. The color space coordinate for the first LED is then stored in memory (step 435), and the selected LED is compared to the final LED (step 440). The selected LED is capable of being compared to the final LED in a variety of ways. For example, each LED is assigned a number, and the number of LEDs in a particular light fixture is stored within a memory of the light fixture. The selected LED corresponding to the variable, A, is compared to the number of LEDs in the light fixture. If the selected LED is not the last light source in the light fixture, the first variable, A, is incremented by one (step 445), and the light source variable, LS, is reset to the new value of the first variable, A (step 420). If the selected LED is the last light source in the light fixture, a target color is obtained (step 450).

The target color is obtained from, for example, a controller or user interface which allows a user to enter a desired target color, or for a target color to be retrieved from memory (e.g., as part of a program or sequence of desired colors). Although the step of obtaining a target color is illustrated as immediately following step 440, the step of obtaining a target color may happen temporally well after the final LED color space coordinate is saved to memory. For example, the calculation and storage of the color space coordinates for each of the light sources in the light fixture may be part of an initialization or manufacturing procedure. In such an instance, the process 400 waits to receive a target color before proceeding. After the target color has been obtained, the target color is converted to a color space coordinate (i.e., using the same color space as the LED color space coordinates) (step 455). The target color space coordinate is then stored to memory (step 460) and the process 400 proceeds to section AA shown in and described with respect to FIG. 14.

Figure 14:
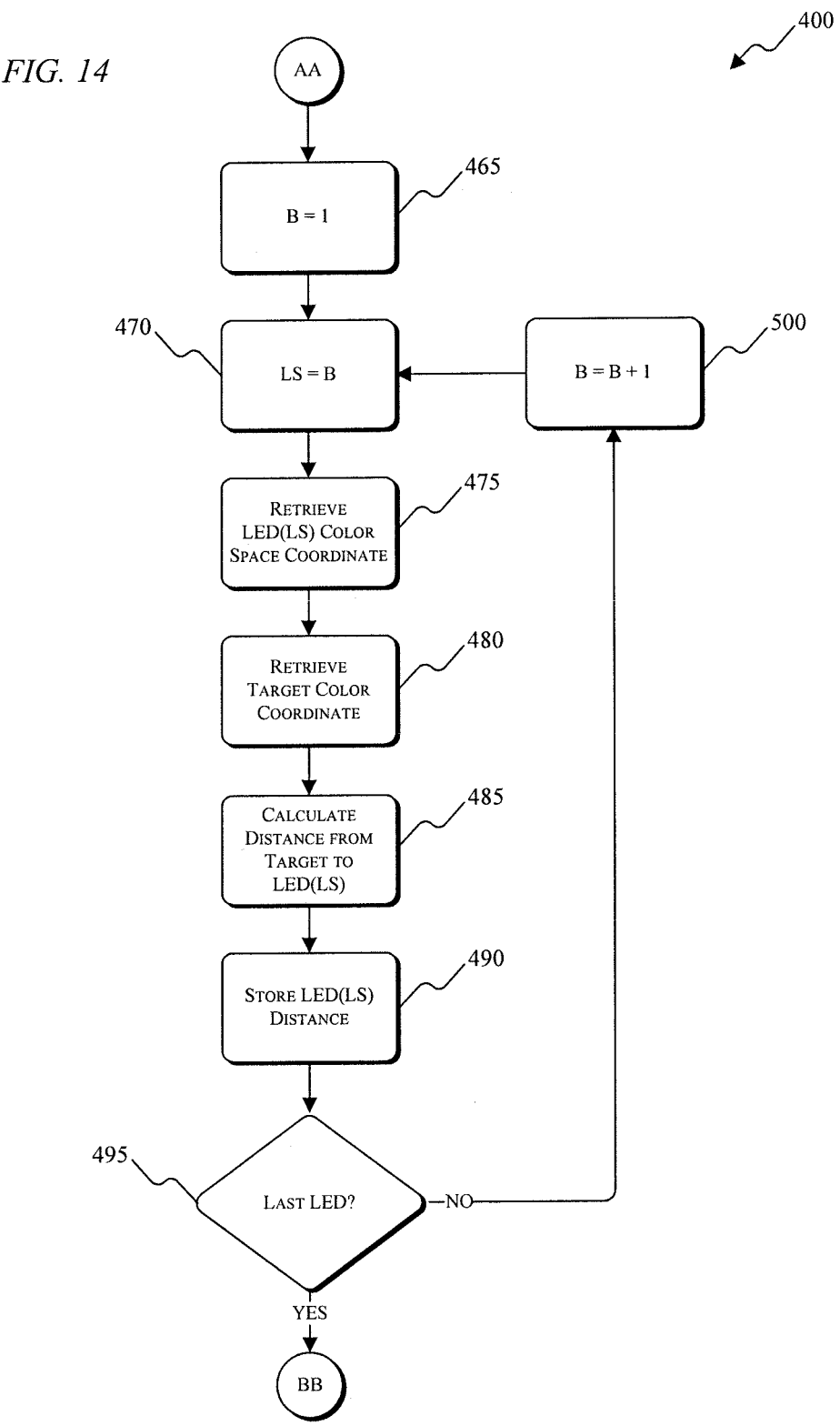

With reference to FIG. 14, a second variable, B, is initialized or set equal to one (step 465), and the light source variable, LS, is set equal to B (e.g., the first light source) (step 470). At step 475, the color space coordinate for the selected light source is retrieved from memory. The target color space coordinate is also retrieved from memory (step 480). The distance between the target color space coordinate and the color space coordinate for the first light source is then calculated (step 485). For example, if the target color space coordinate is designated by an x-coordinate, $x_T$, and a y-coordinate, $y_T$, and the first light source is designated by an x-coordinate, $x_1$, and a y-coordinate, $y_1$, the distance, $D_1$, between the target color space coordinate and the first light source coordinate can be calculated as shown below in EQN. 7. EQN. 7 can be used to calculate the distance between each of the light sources in the light fixture and the target color space coordinate.

$$D_1 = \sqrt{(x_T - x_1)^2 + (y_T - y_1)^2} \qquad \text{EQN. 7}$$

The calculated distance, $D_1$, for the first light source is then stored in memory (step 490). The selected light source corresponding to the second variable, B, is compared to the number of LEDs in the light fixture. If the selected light source is not the last light source in the light fixture, the second variable, B, is incremented by one (step 500) and the light source variable, LS, is reset to the new value of the second variable, B (step 470). If the selected light source is the last light source in the light fixture, the process 400 proceeds to section BB shown in and described with respect to FIG. 15.

Figure 15:
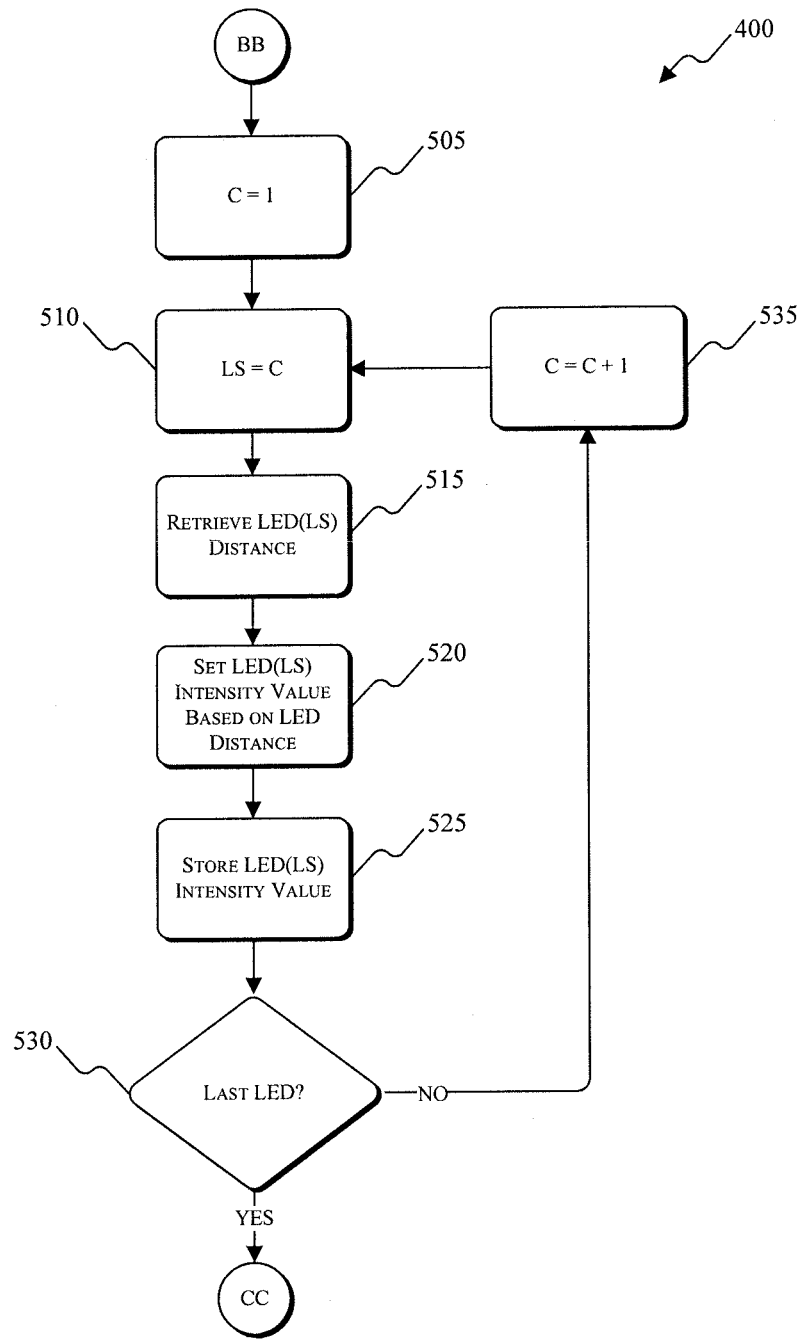

With reference to FIG. 15, a third variable, C, is initialized or set equal to one (step 505), and the light source variable, LS, is set equal to C (e.g., the first light source) (step 510). At step 515, the distance between the first light source and the target color coordinate is retrieved from memory. An intensity level for the first light source is then set based on the retrieved distance (step 520), and the intensity level is stored to memory (step 525). For example, the greater the distance between the light source color space coordinate and the target color space coordinate, the lower the initial intensity value is set. As such, the distance between the light source color space coordinate, and the target color space coordinate and the initial output intensity value for the light source are inversely related. In some implementations, the inverse relationship is a linear inverse relationship. In other implementations, the inverse relationship is an exponential, logarithmic, or the like. The light source intensities are, for example, one byte. Therefore, each light source intensity has a value between 0 (i.e., no output) and 255 (i.e., full-scale). After the initial output intensity value for light source is set, the selected light source corresponding to the third variable, C, is compared to the number of LEDs in the light fixture (step 530). If the selected light source is not the last light source in the light fixture, the third variable, C, is incremented by one (step 535) and the light source variable, LS, is reset to the new value of the third variable, C (step 510). If the selected light source is the last light source in the light fixture, the process 400 proceeds to section CC shown in and described with respect to FIG. 16.

Figure 16:
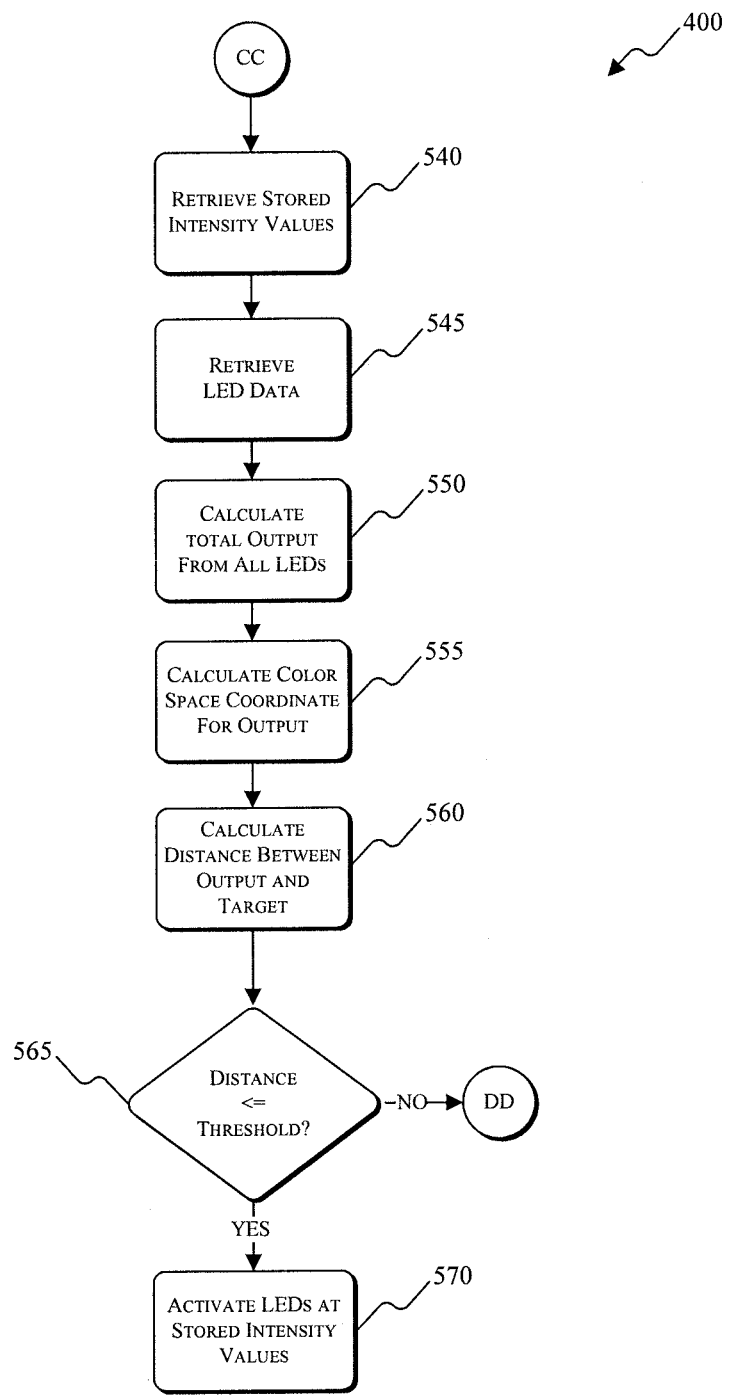

At step 540 shown in FIG. 16, all of the light source intensity values are retrieved or accessed from memory. The stored LED data is also retrieved from memory (step 545) such that the total output of the light fixture (i.e., the output of each light source) can be calculated (step 550). For example, the output intensity of each light source with respect to wavelength is determined based on the initial output intensity values for each light source and the LED data. The output intensities of each light source are then combined to produce a set of data corresponding to the total output for the light fixture. The total output of the light fixture is then used to calculate a color space coordinate (step 555) for the total output of the light fixture based on the initial light source output intensity values and the color matching functions described above. The distance between the total light fixture output color space coordinate and the target color space coordinate is then calculated (step 560) using, for example, EQN. 7 above. The distance calculated at step 560 is compared to a threshold value (step 565). The threshold value is, for example, a distance value, a percent-error value, a mean square error ("MSE"), or the like. If the distance is not less than or equal to the threshold value, the process 400 proceeds to section DD shown in and described with respect to FIG. 17. If the initial output intensity values for the light sources resulted in a light fixture output color space coordinate that was less than or equal to the threshold value, the light sources are driven or activated at the stored initial output intensity values (step 570).

Figure 17:
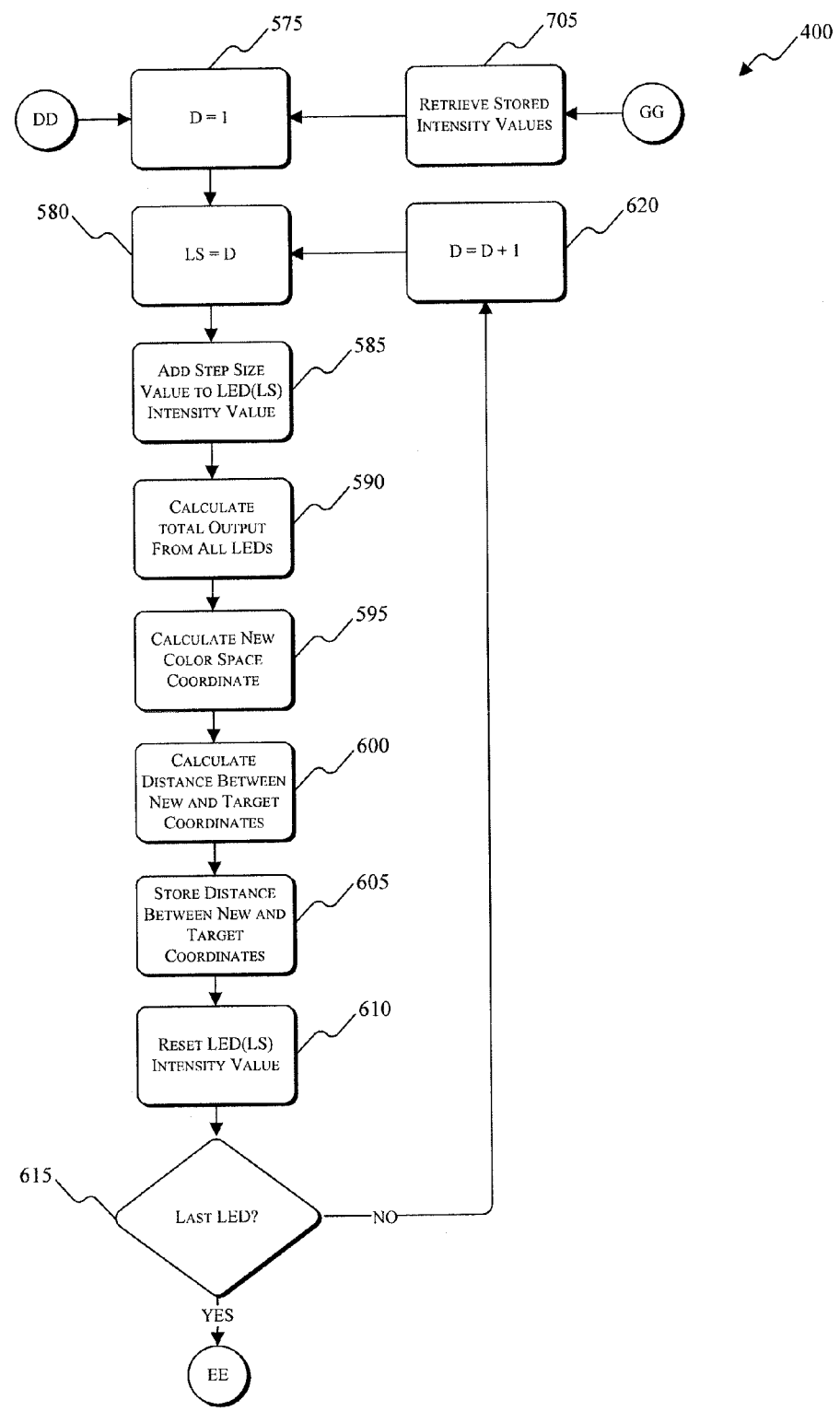

With reference to FIG. 17 and step 575, a fourth variable, D, is initialized or set equal to one, and the light source variable, LS, is set equal to D (e.g., the first light source) (step 580). At step 585, a step size value is added to the output intensity value of the selected light source. The step size value is based on, for example, the separation or distance between the total light fixture output color space coordinate and the target color space coordinate (e.g., the step size value is proportional to the separation between the total light fixture output color space coordinate and the target color space coordinate). For example, if the distance between the total light fixture output color space coordinate and the target color space coordinate is greater than or equal to one or more threshold values, the step size value is set proportionally large. If the distance between the total light fixture output color space coordinate and the target color space coordinate is less than or equal to one or more threshold values, the step size value is set proportionally small. In some implementations, the step size value is a percentage value, an incremental intensity value, or the like. For example, if the step size value is 5%, the output intensity value for the light source is increased by 5%. Using the new output intensity value for the selected light source, the previously retrieved initial output intensity values for the remaining light sources (i.e., the un-modified initial output intensity values), and the previously retrieved LED data, the total output of the light fixture is recalculated (step 590). The color space coordinate for total light fixture output is also recalculated (step 595). The distance between the new color space coordinate for the total light fixture output and the target color coordinate is calculated (step 600), and the distance between the new color space coordinate for the total output and the target color coordinate is stored to memory (step 605). The output intensity value for the selected light source is then reset to the previous (i.e., un-modified) output intensity value (step 610). The selected light source corresponding to the fourth variable, D, is compared to the number of LEDs in the light fixture (step 615). If the selected light source is not the last light source in the light fixture, the fourth variable, D, is incremented by one (step 620) and the light source variable, LS, is reset to the new value of the fourth variable, D (step 580). The process 400 repeats steps 585-615 until the step size value has been added to each output intensity value for the light sources. If the selected light source is the last light source in the light fixture, the process 400 proceeds to section EE shown in and described with respect to FIG. 18.

Figure 18:
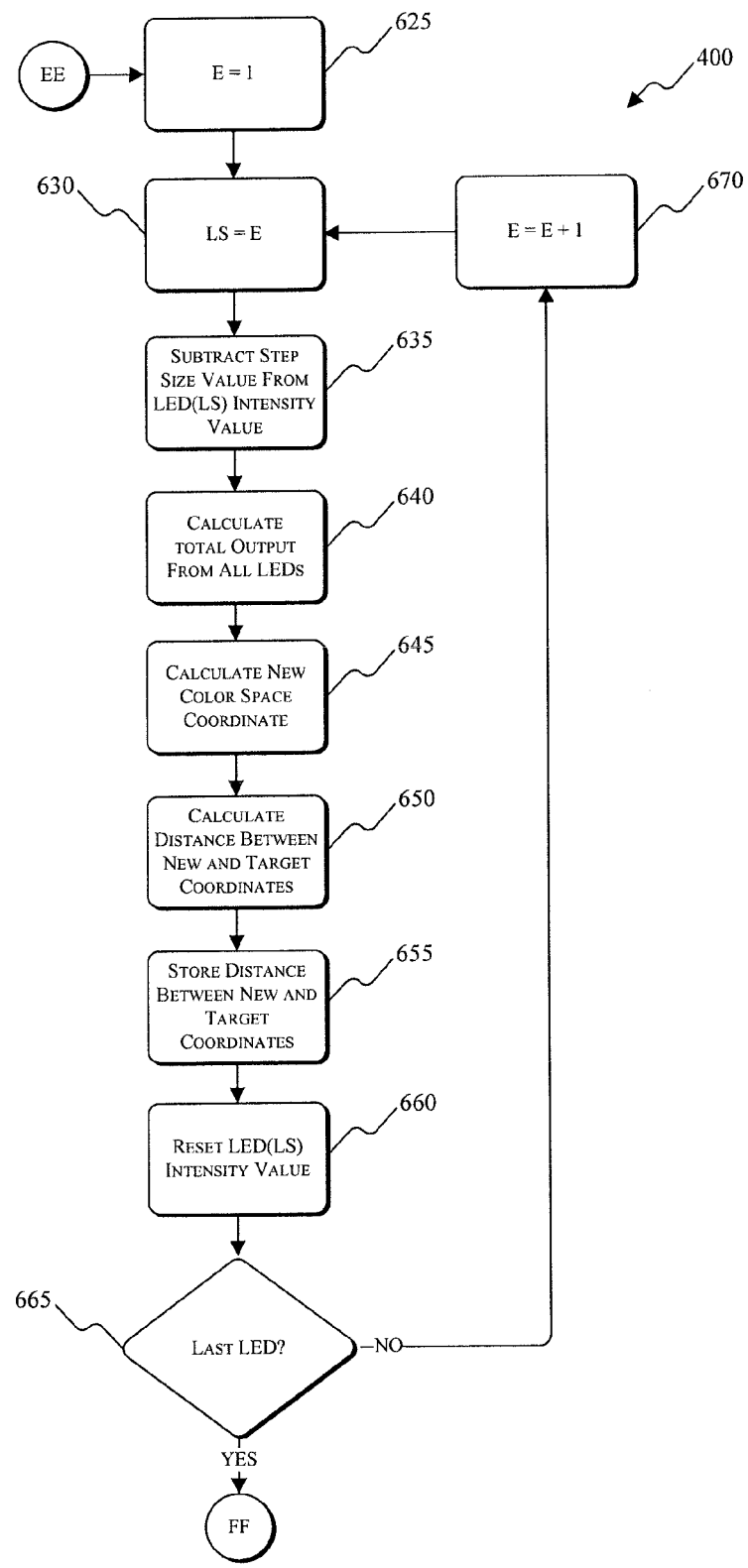

At step 625 in FIG. 18, a fifth variable, E, is initialized or set equal to one (step 625), and the light source variable, LS, is set equal to the fifth variable, E (e.g., the first light source) (step 630). At step 635, a step size value is subtracted from the output intensity value of the selected light source. As described above, in some implementations, the step size value is based on the separation or distance between the total light fixture output color space coordinate and the target color space coordinate, and the step size value is a percentage value, a decremental intensity value, or the like. For example, if the step size value is 5%, the output intensity value for the light source is decreased by 5%. Using the new output intensity value for the selected light source, the previously retrieved initial output intensity values for the remaining light sources, and the previously retrieved LED data, the total output of the light fixture is recalculated (step 640). The color space coordinate for total light fixture output is also recalculated (step 645). The distance between the new color space coordinate for the total light fixture output and the target color coordinate is calculated (step 650), and the distance between the new color space coordinate for the total output and the target color coordinate is stored in memory (step 655). The output intensity value for the selected light source is then reset to the previous output intensity value (step 660). The selected light source corresponding to the fifth variable, E, is compared to the number of LEDs in the light fixture (step 665). If the selected light source is not the last light source in the light fixture, the fifth variable, E, is incremented by one (step 670), and the light source variable, LS, is reset to the new value of the fifth variable, E (step 630). The process 400 repeats steps 635-665 until the step size value has been subtracted from each output intensity value for the light sources. If the selected light source is the last light source in the light fixture, the process 400 proceeds to section FF shown in and described with respect to FIG. 19. In some implementations, the addition and subtraction of the step size value to the output intensity of each light source are performed consecutively as opposed to adding the step size value to the output intensity of each LED source and then subtracting the step size value from each light source. In other implementations, subtraction of the step size value is performed before the addition of the step size value. Additionally or alternatively, the step size value varies between the addition and subtraction or from light source to light source based on, for example, initial intensity values, a calculated distance, or another feedback criterion.

Figure 19:
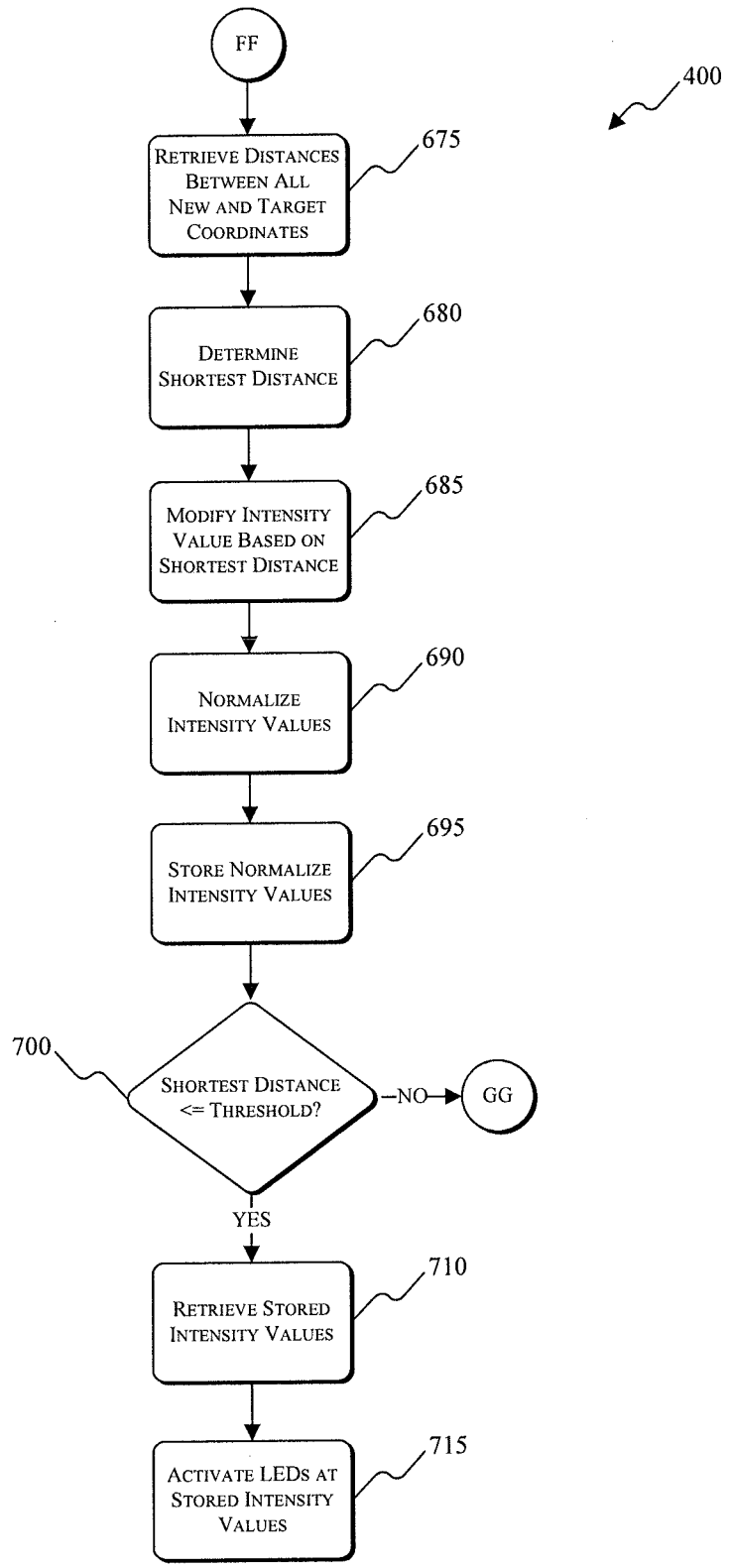

With reference to FIG. 19, after the step size value has been added to and subtracted from the stored intensity values for each of the light sources, the stored distances associated with total light fixture output for each of the modified intensity values are retrieved or accessed from memory (step 675). For example, a seven light source light fixture has fourteen distance values stored in memory corresponding to the addition and subtraction of a step size value from the stored output intensity values for each light source. The retrieved distances are then compared to one another to determine the shortest distance (step 680). The shortest distance value corresponds to the set of output intensity values that resulted in the least amount of error (i.e., the addition or subtraction of the step size value that resulted in the most beneficial change in the output of the light fixture). After the shortest distance has been identified, the stored output intensity values are modified (step 685) to correspond to the output intensity values that produced the shortest distance. For example, the step size value is added to or subtracted from a single output intensity value.

After the step size value has been added to or subtracted from the output intensity value, the output intensity values of each of the light sources are normalized (step 690). For example, modifying the output intensity values as described above can result in each of the light sources having an output intensity value of less than 100%. In such an instance, the light source or light sources having the highest output intensity value are normalized to a 100.0% output intensity value. As an illustrative example, a light fixture including seven light sources has output intensity values for each of the light sources (following step 685) as shown below in Table #1. Because the green light source has the highest output intensity value (i.e., 80.0%), the output intensity value of the green light source is reset to an output intensity value of 100.0%. The increase in the output intensity value of the green light source is 25.0% based on the un-normalized output intensity value. As such, the output intensity values of each of the remaining light sources are also increased by 25.0% based on the un-normalized output intensity values. For example, the red light source has an un-normalized output intensity value of 40.0%. Increasing the output intensity by 25.0% results in a normalized output intensity value of 50.0%. The output intensity values of the light sources are normalized to ensure or at least approximate the combination of light source output intensity values that produces a maximum lumen output (i.e., a maximum luminous flux) for the light fixture. Although the step of normalizing the light source output intensity values is shown following step 685, the output intensity values can be normalized in the same or a similar manner later in the process 400 (e.g., following step 695, step 700, step 705, or step 710 (all described below)).

TABLE #1

Normalized Light Source Output Intensity Values

| Color | Un-Normalized Intensity | Normalized Intensity |
|---|---|---|
| Red | 40.0% | 50.0% |
| Red-Orange | 50.0% | 62.5% |
| Amber | 60.0% | 75.0% |
| Green | 80.0% | 100.0% |
| Cyan | 30.0% | 37.5% |
| Blue | 10.0% | 12.5% |
| Indigo | 20.0% | 25.0% |

The new output intensity values corresponding to that light sources are then stored in memory (step 695). The shortest distance is then compared to the threshold value (step 700). Because the normalization described above modified the output intensities of the light sources by the same amount, the ratios of the light source intensities remain the same. As such, the shortest distance that was determined at step 680 remains unchanged and does not need to be recalculated following the normalization of step 690. As described above, the threshold value is, for example, a distance value, a percent-error value, or the like. If the distance is not less than or equal to the threshold value, the process 400 proceeds to section GG shown in and described with respect to FIG. 17 where the new intensity values are retrieved from memory (step 705) and a step size value is again added to and subtracted from the new stored output intensity values. If the distance is less than the threshold value, the new light source intensity values are retrieved or accessed from memory (step 710), and the light sources are driven or activated at the stored output intensity values (step 715). Additionally, because the process 400 is capable of being executed by the light fixture itself and no powerful central computer is required, each light fixture in a system of light fixtures is capable of executing the process 400 in a parallel manner.

After the output intensity values required to produce the target color have been identified, or the light sources have been driven to those output intensity values, the user is able to modify the spectral content of the output of the light fixture. For example, because the light fixture includes four or more light sources (e.g., seven light sources), a desired output of the light fixture can, potentially, be achieved using a variety of different combinations of lights sources having different output intensity values. These combinations of light sources are known as metamers. Metamers correspond to the same color output of the light fixture, but vary in spectral content. The spectral content of the output of the light fixture can be important, for example, when the output of the light fixture is illuminating an object or background that is not white. In such an instance, the user may determine that the output of the light fixture should include more or less of a particular light source (i.e., a color).

Figure 20A:
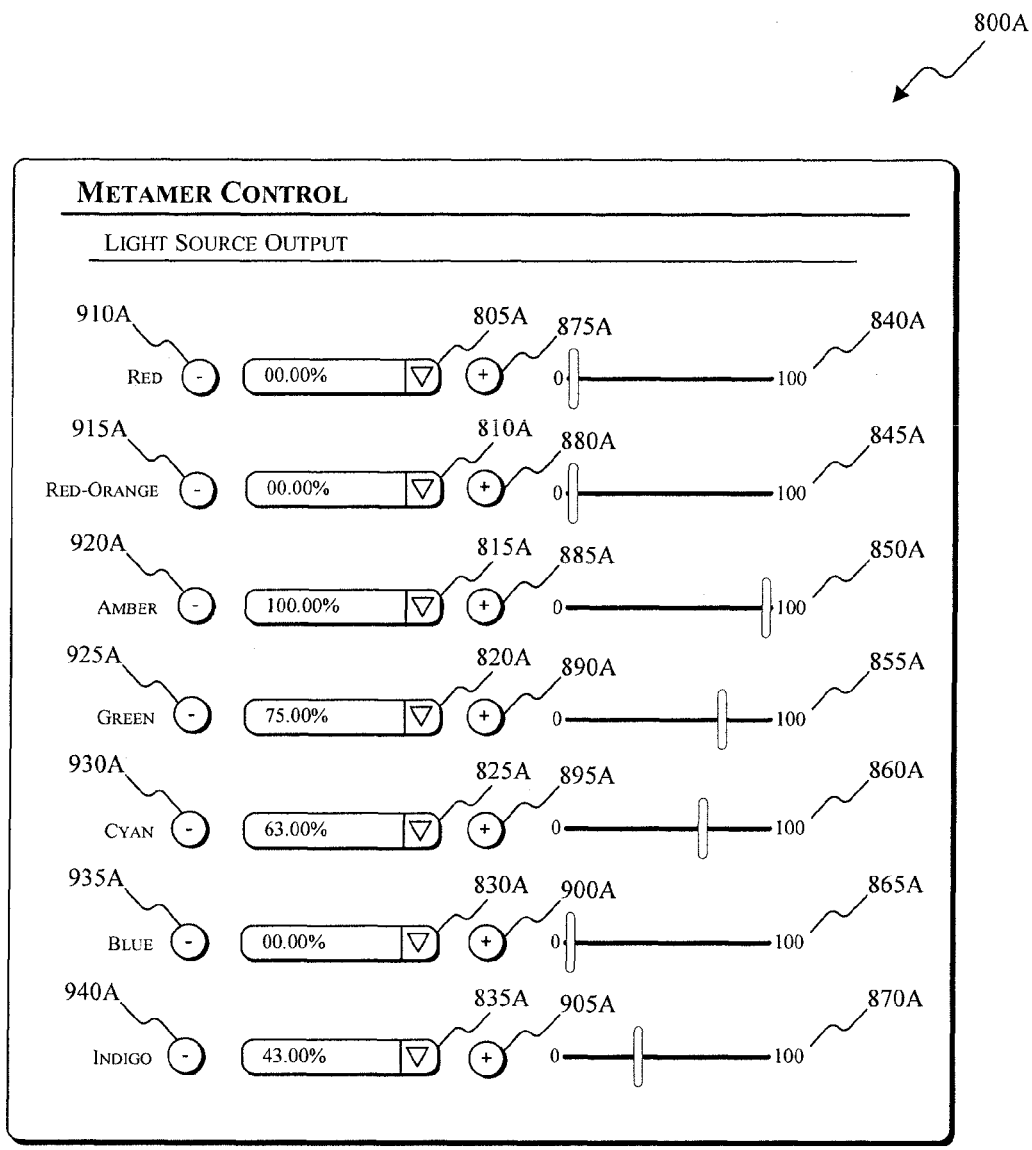
FIG. 20A illustrates a user control interface according to one construction of the invention.

As such, the user is able to modify the spectral content of the output of the light fixture by manually controlling the output of individual light sources. FIG. 20A illustrates a user control interface 800A (e.g., a graphical user interface ("GUI")) that is displayed on, for example, a monitor or a similar display. In some constructions, the user control interface 800A is a physical interface and includes one or more buttons, knobs, dials, faders, or the like. The user control interface 800A includes a plurality of input portions 805A-

835A corresponding to the light source output intensity values for each of the light sources in a light fixture. In the illustrated construction, the input portions 805A-835A correspond to red, red-orange, amber, green, cyan, blue, and indigo light sources. The input portions 805A-835A are individually controlled by directly selecting and modifying output intensity values for the light sources. Each of the input portions 805A-835A enables a user to modify or populate the input portion with a desired control value (e.g., a percent). For example, the user populates the input portions 805A-835A by entering text via a mechanical or virtual keyboard of a computer or similar processing device, and using a pointing or selection device such as a mouse to control a curser on the display. Input signals from the keyboard and the mouse are received, processed, and translated into a visual result or action in the interface 800A. For example, if the user enters text using a keyboard, the activated keys produce signals which are represented as type-written text in the interface 800A. Similarly, a mouse click, which corresponds to a location of the cursor on the screen, results in selecting/deselecting a dropdown menu, the position of a fader, etc. In other implementations, the interface is accessed and controlled using a touch-screen device and a user's finger strokes or tapping are used to populate or modify the input portions. For example, the input portions 805A-835A can be modified using faders 840A-870A, increment and decrement buttons 875A-905A and 910A-940A, respectively, a drop-down menu, or the like.

Figure 20B:
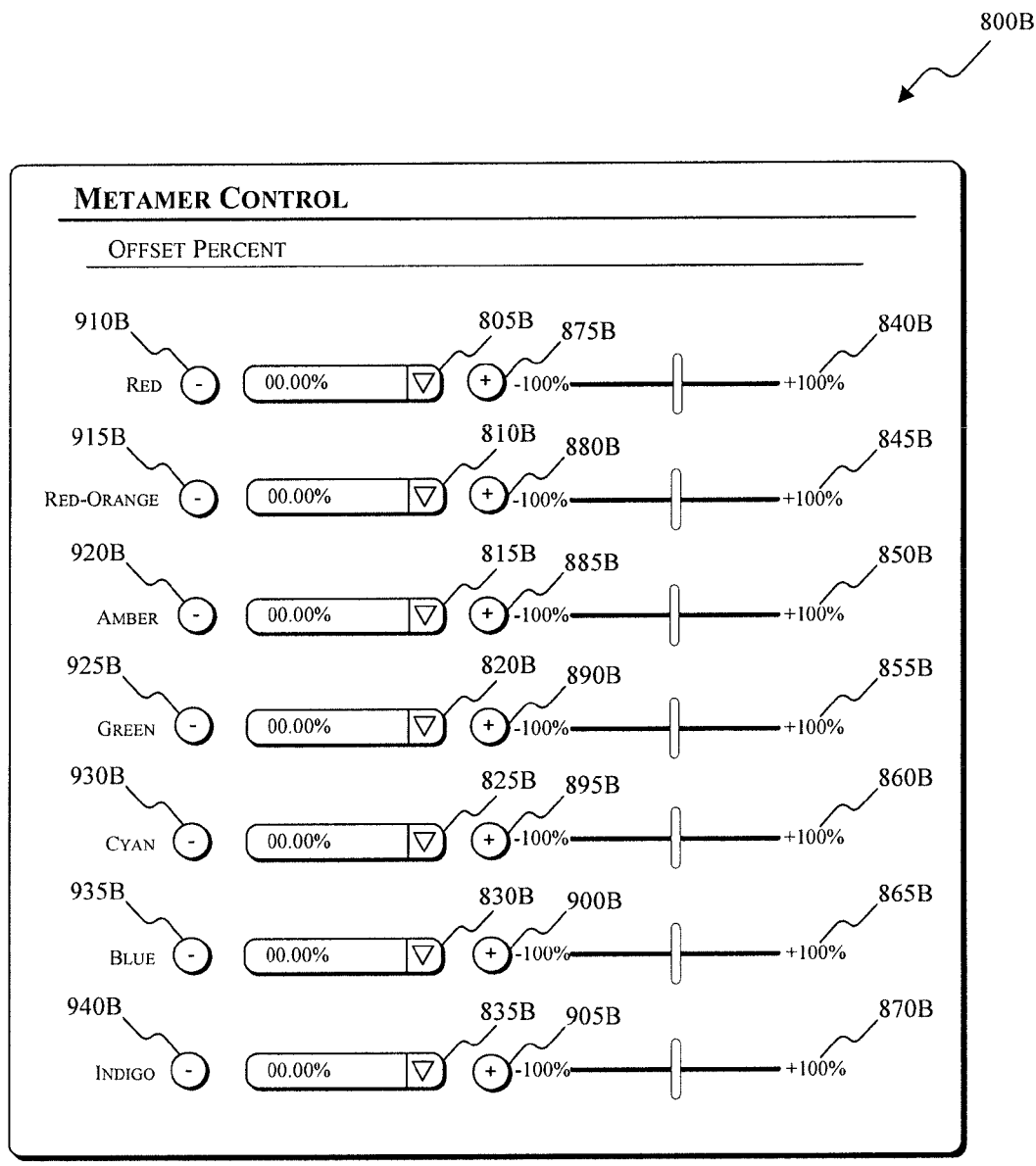
FIG. 20B illustrates a user control interface according to another construction of the invention.
Figure 21:
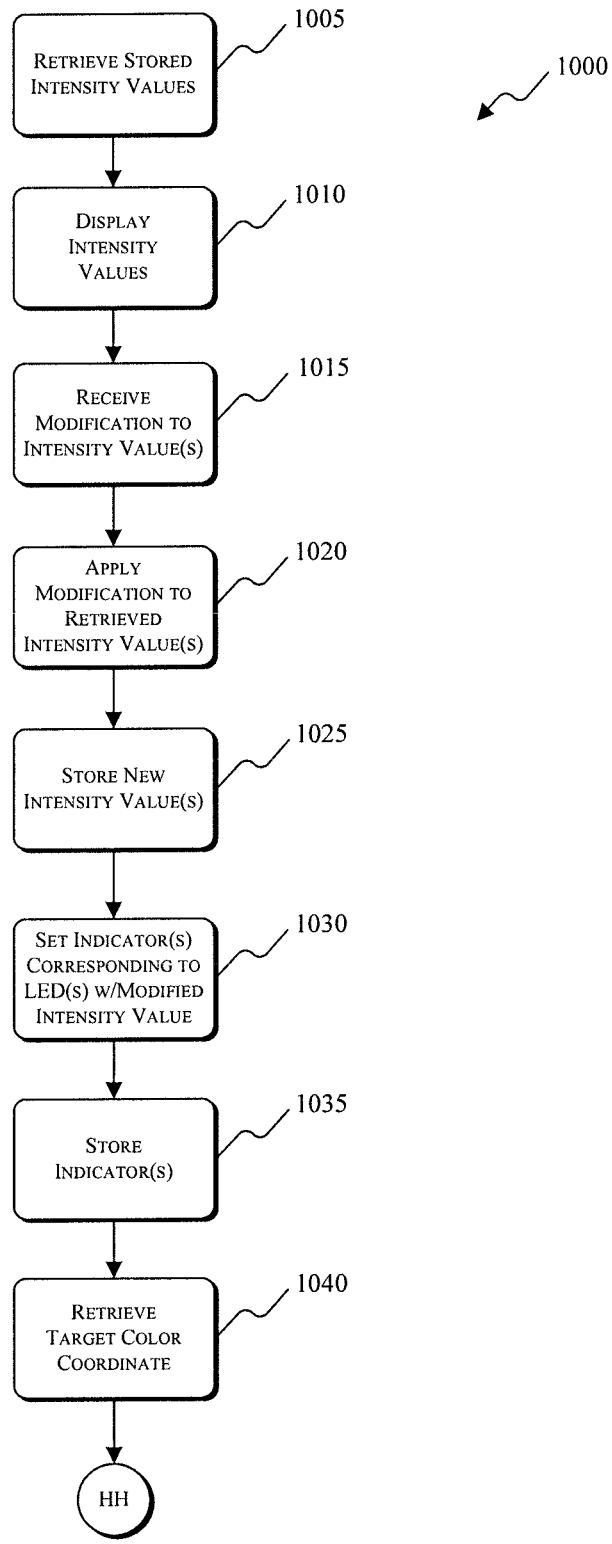
FIGS. 21-27 are a process for controlling the spectral content of an output of a light fixture according to an implementation of the invention.

FIG. 20B illustrates another user control interface 800B (e.g., a GUI) that is similar to the user control interface 800A described above with respect to FIG. 20A. In some constructions, the user control interface 800B is a physical interface and includes one or more buttons, knobs, dials, faders, or the like. The user control interface 800B includes a plurality of input portions 805B-835B corresponding to the light source offset percentage values for each of the light sources (i.e., colors) in the light fixture. In the illustrated construction, the input portions 805B-835B correspond to red, red-orange, amber, green, cyan, blue, and indigo light sources. The input portions 805B-835B are individually controlled by directly selecting and modifying offset percentage values for the light sources. In some implementations, the offset percentage values can be adjusted between −100% and +100%, and an offset percentage value of 0% indicates that no changes are to be made. Each of the input portions 805B-835B enables a user to modify or populate the input portion with a desired offset percentage value. For example, the user populates the input portions 805B-835B by entering text via a mechanical or virtual keyboard of a computer or similar processing device, and using a pointing or selection device such as a mouse to control a curser on the display. Input signals from the keyboard and the mouse are received, processed, and translated into a visual result or action in the interface 800B. For example, if the user enters text using a keyboard, the activated keys produce signals which are represented as type-written text in the interface 800B. Similarly, a mouse click, which corresponds to a location of the cursor on the screen, results in selecting/deselecting a dropdown menu, the position of a fader, etc. In other implementations, the interface is accessed and controlled using a touch-screen device and a user's finger strokes or tapping are used to populate or modify the input portions. For example, the input portions 805B-835B can be modified using faders 840B-870B, increment and decrement buttons 875B-905B and 910B-940B, respectively, a drop-down menu, or the like.

FIGS. 21-27 illustrate a process 1000 for controlling the spectral content of an output of a light fixture, and identifying light source output intensity values to achieve the desired control. The process 1000 is capable of being performed by an individual light fixture or by a controller that is external to and in communication with a light fixture. Following process 400 described above, the output intensity values for the light sources are retrieved from memory (step 1005). The output intensity values correspond to a set of output intensity values that produce a desired output color. As described above, a number of metamers may also be used to produce the same output color, but with different spectral content. To allow the user to select one or more discrete metamers, the output intensity values determined using the process 400 are displayed to a user (step 1010). If the user wants to modify the spectral content of the output of the light fixture, the user manually modifies one or more of the output intensity values for the light sources. The output intensity values are modified using, for example, the user control interface 800A described above with respect to FIG. 20A, such that signals corresponding to the user modifications are received by the controller 105 within the light fixture or an external controller connected to the light fixture (step 1015). Additionally or alternatively, the user selects an offset percentage value for one or more of the light sources (see FIG. 20B). The user modifications correspond to an increase or decrease in an amount of one or more colors in the output of the light fixture. For example, the user modification may correspond to an increase or decrease (e.g., a percent increase or decrease) in an output intensity value for a light source. In some implementations, the user modifications are directly related to the increase or decrease in the amount of one or more colors in the output of the light fixture.

At step 1020, the user modifications to the output intensity of one or more light sources are applied to the retrieved output intensity values, and the modified output intensity values are stored to memory (step 1025). In addition to storing the modified output intensity values, an indicator, such as a flag or a bit, is set that corresponds to each of the light sources' output intensity values that were modified by the user (step 1030). The indicator is then stored to memory (step 1035), and the target color coordinate is retrieved from memory (step 1040). The indicators are used to identify the modified light source output intensity values in subsequent steps of the process 1000. For example, in some implementations, if an output intensity value for a particular light source has been modified, it is identified as such using a corresponding flag or bit (e.g., a flag or bit having a value of "1" indicates that the output intensity value for a light source has been modified by a user). After the indicator has been used to identify the light sources with user-modified output intensity values, the value that is set by the user for a particular output intensity value is maintained throughout the process 1000, or at least until a solution that includes the desired spectral content for the output for that light source is identified. In some implementations, maintaining the output intensity value includes maintaining a discrete value for the output intensity value, maintaining a ratio between the user-modified output intensity value and one or more of the remaining output intensity values, or the like. Following step 1040, the process 1000 proceeds to section HH shown in and described with respect to FIG. 22.

Figure 22:
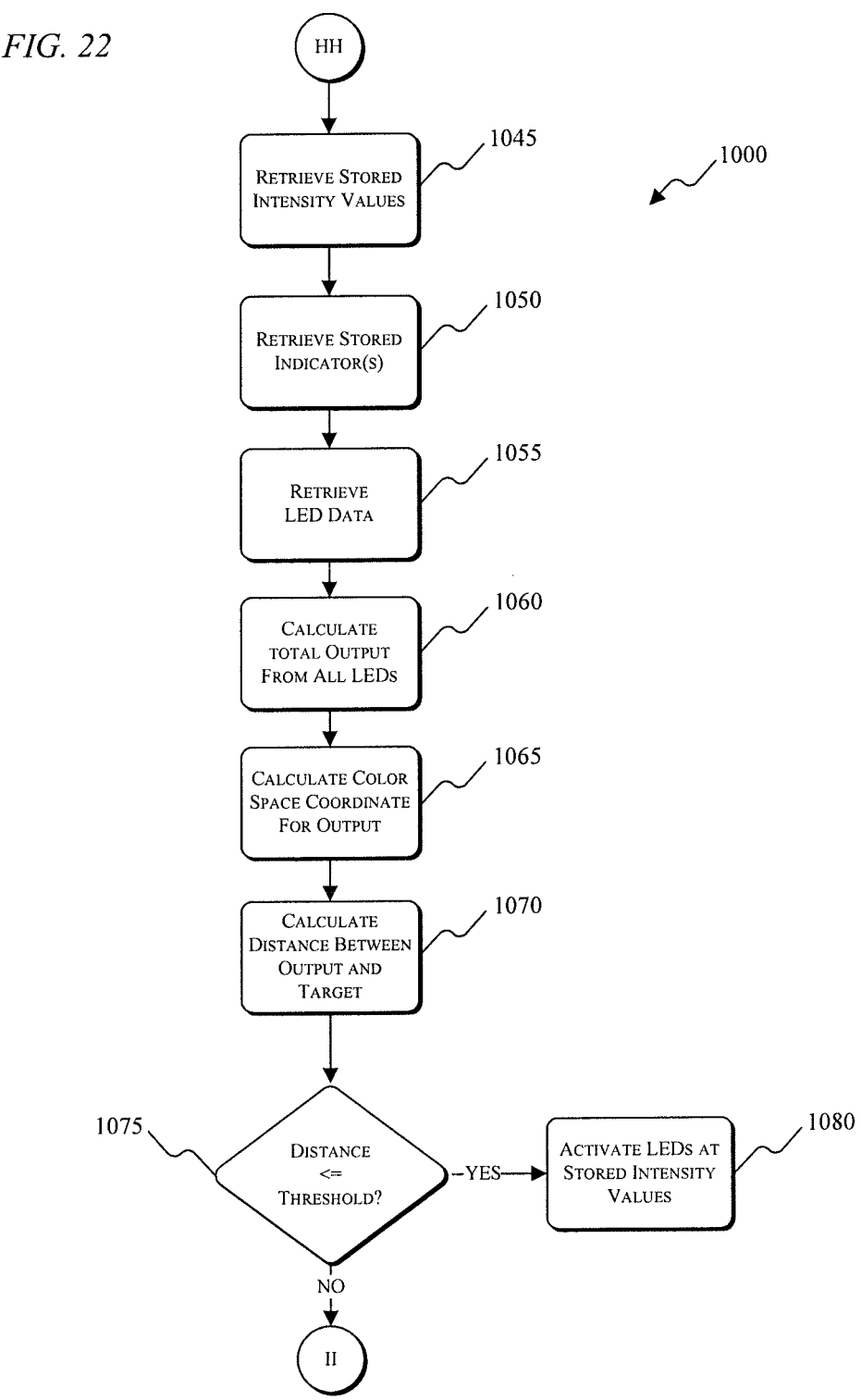

With reference to FIG. 22, all of the light source output intensity values are retrieved or accessed from memory (step 1045), and the indicators corresponding to the light sources with output intensity values that were modified by the user are retrieved or accessed from memory (step 1050). The stored LED data is retrieved from memory (step 1055), and the output intensity values for each light source are then combined such that the total output of the light fixture (i.e., the output of each light source) can be calculated (step 1060). The total output of the light fixture is then used to calculate a color space coordinate (step 1065) for the total output of the light fixture based on the stored light source output intensity values and the color matching functions described above. The distance between the total light fixture output color space coordinate and the target color space coordinate is then calculated (step 1070) using, for example, EQN. 7 above. The distance calculated at step 1070 is compared to a threshold value (step 1075). The threshold value is, for example, a distance value, a percent-error value, an MSE, or the like. If the distance is not less than or equal to the threshold value, the process 1000 proceeds to section II shown in and described with respect to FIG. 23. If the stored output intensity values for the light sources resulted in a distance that was less than or equal to the threshold value, the light sources are driven or activated at the stored output intensity values (step 1080) (i.e., the output intensity values that include the user modifications to one or more of the output intensity values).

Figure 23:
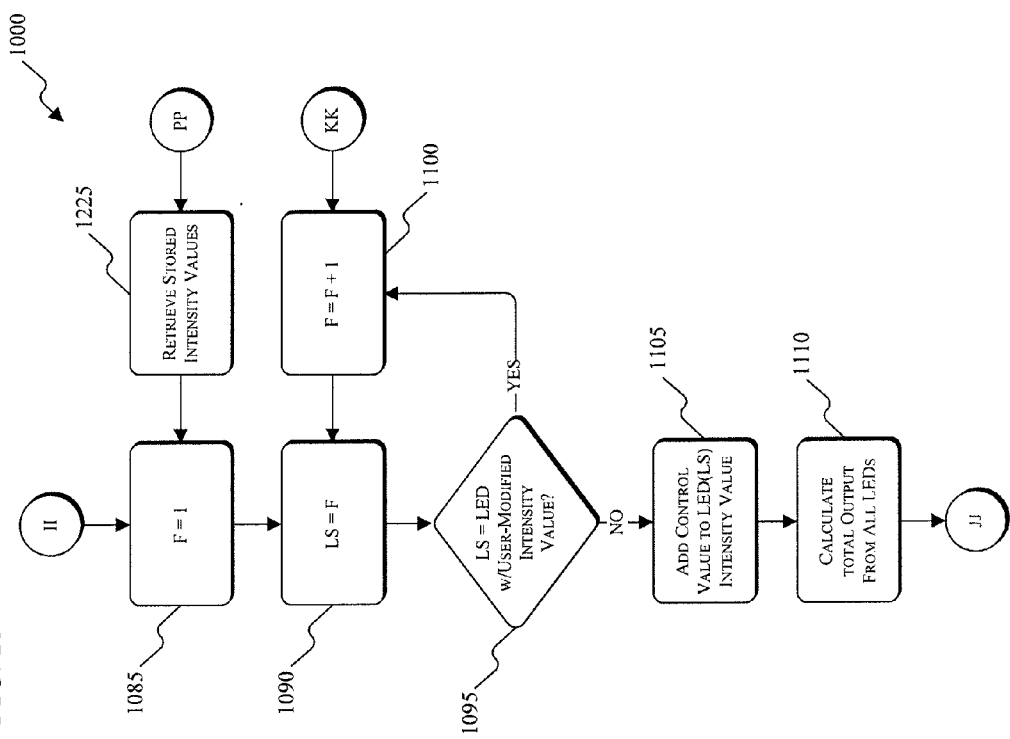
Figure 26:
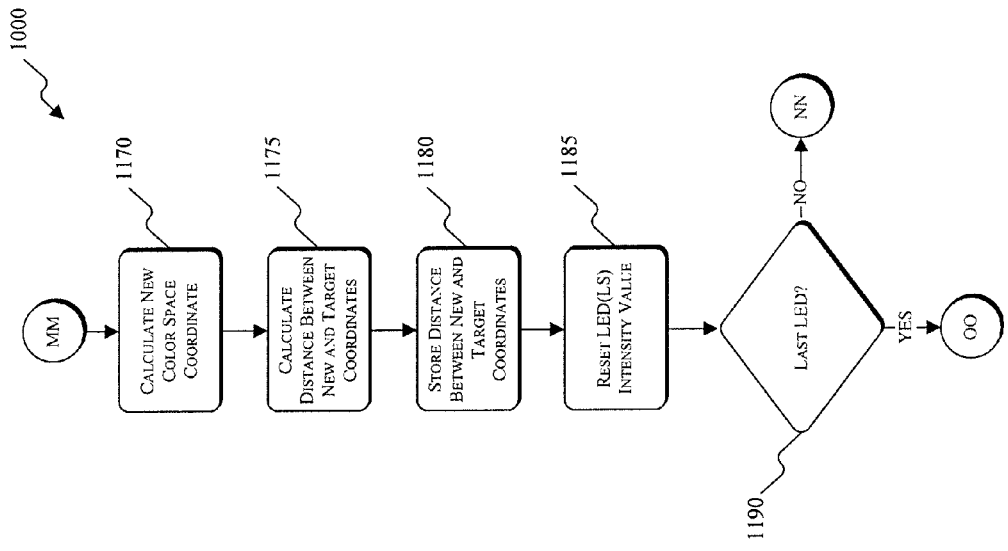

With reference to FIG. 23 and step 1085, a sixth variable, F, is initialized or set equal to one, and the light source variable, LS, is set equal to the sixth variable, F (e.g., the first light source) (step 1090). The selected light source is compared to the retrieved indicators that correspond to the light sources that received user modifications to their output intensity values (step 1095). If an indicator was set that corresponds to the selected light source, the sixth variable, F, is incremented (step 1100), and the light source variable, LS, is set equal to the new value of the sixth variable, F (step 1090). If no indicator was set that corresponds to the selected light source, a step size value is added to the output intensity value of the selected light source (step 1105). The step size value is based on, for example, the separation or distance between the total light fixture output color space coordinate and the target color space coordinate (e.g., the step size value is proportional to the separation between the total light fixture output color space coordinate and the target color space coordinate). For example, if the distance between the total light fixture output color space coordinate and the target color space coordinate is greater than or equal to one or more threshold values, the step size value is set proportionally large. If the distance between the total light fixture output color space coordinate and the target color space coordinate is less than or equal to one or more threshold values, the step size value is set proportionally small. In some implementations, the step size value is a percentage value, an incremental intensity value, or the like. For example, if the step size value is 5%, the output intensity value for the light source is increased by 5%. Using the new output intensity value for the selected light source, the stored output intensity values for the remaining light sources, and the previously retrieved LED data, the total output of the light fixture is calculated (step 1110). The process 1000 then proceeds to section JJ shown in and described with respect to FIG. 24.

Figure 24:
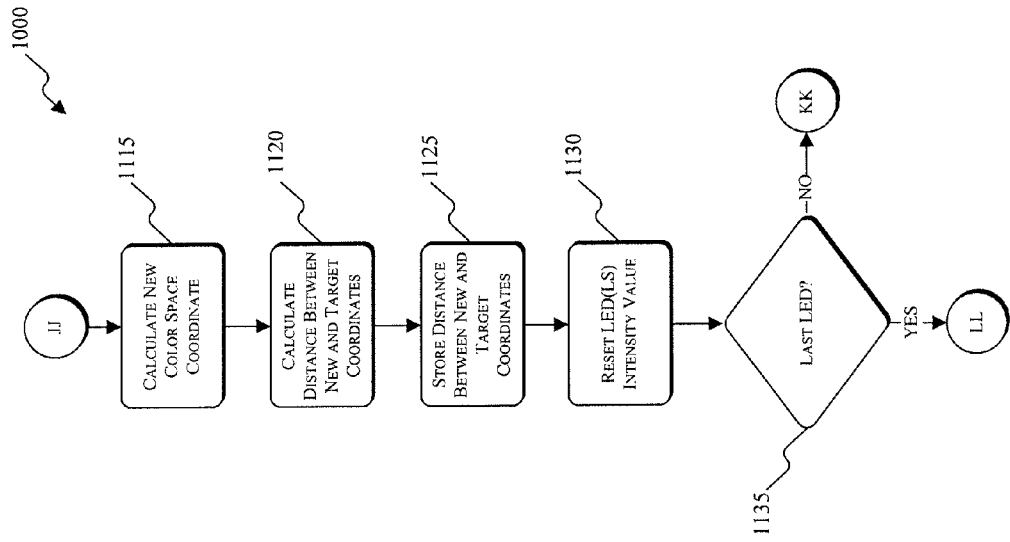

At step 1115 in FIG. 24, the color space coordinate for total light fixture output is recalculated. The distance between the new color space coordinate for the total light fixture output and the target color coordinate is calculated (step 1120), and the distance between the new color space coordinate for the total output and the target color coordinate is stored to memory (step 1125). The output intensity value for the selected light source is then reset to the previous output intensity value (step 1130) (i.e., the output intensity value prior to adding the step size value). The selected light source corresponding to the sixth variable, F, is compared to the number of light sources in the light fixture (step 1135). If the selected light source is not the last light source in the light fixture, the sixth variable, F, is incremented by one (step 1100) (see FIG. 23) and the light source variable, LS, is reset to the new value of the sixth variable, F (step 1090). The process 1000 repeats steps 1090-1135 until the step size value has been added to each non-user-modified output intensity value for the light sources. As previously described, the light sources that include output intensity values that have been modified by the user are maintained during this portion of the process 1000. If the selected light source is the last light source in the light fixture, the process 1000 proceeds to section LL shown in and described with respect to FIG. 25.

Figure 25:
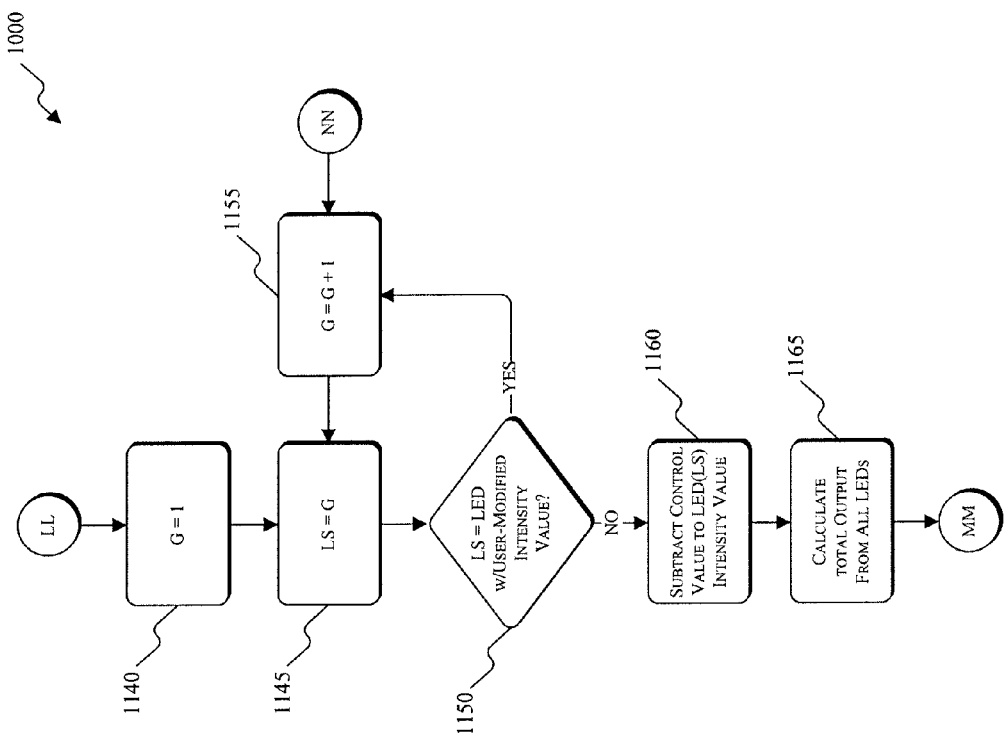

At step 1140 in FIG. 25, a seventh variable, G, is initialized or set equal to one, and the light source variable, LS, is set equal to the seventh variable, G (e.g., the first light source) (step 1145). The selected light source is compared to the retrieved indicators that correspond to the light sources that received user modifications to their output intensity values (step 1150). If an indicator was set that corresponds to the selected light source, the seventh variable, G, is incremented (step 1155), and the light source variable, LS, is set equal to the new value of the seventh variable, G (step 1145). If no indicator was set that corresponds to the selected light source, a step size value is subtracted from the output intensity value of the selected light source (step 1160). The step size value is based on, for example, the separation or distance between the total light fixture output color space coordinate and the target color space coordinate (e.g., the step size value is proportional to the separation between the total light fixture output color space coordinate and the target color space coordinate). For example, if the distance between the total light fixture output color space coordinate and the target color space coordinate is greater than or equal to one or more threshold values, the step size value is set proportionally large. If the distance between the total light fixture output color space coordinate and the target color space coordinate is less than or equal to one or more threshold values, the step size value is set proportionally small. In some implementations, the step size value is a percentage value, an decremental intensity value, or the like. For example, if the step size value is 5%, the output intensity value for the light source is decreased by 5%. Using the new output intensity value for the selected light source, the stored output intensity values for the remaining light sources, and the previously retrieved LED data, the total output of the light fixture is calculated (step 1165). The process 1000 then proceeds to section MM shown in and described with respect to FIG. 26.

At step 1170, the color space coordinate for total light fixture output is recalculated. The distance between the new color space coordinate for the total light fixture output and the target color coordinate is calculated (step 1175), and the distance between the new color space coordinate for the total output and the target color coordinate is stored in memory (step 1180). The output intensity value for the selected light source is then reset to the previous output intensity value (step 1185). The selected light source corresponding to the seventh variable, G, is compared to the number of light sources in the light fixture (step 1190). If the selected light source is not the last light source in the light fixture, the seventh variable, G, is incremented by one (step 1155) (see FIG. 25), and the light source variable, LS, is reset to the new value of the seventh variable, G (step 1145). The process 1000 repeats steps 1145-1190 until the step size value has been subtracted from each non-user-modified output intensity value for the light sources. As described above, the light sources that include output intensity values that have been modified by the user are maintained during this portion of the process 1000. If the selected light source is the last light source in the light fixture, the process 1000 proceeds to section OO shown in and described with respect to FIG. 27. In some implementations, the addition and subtraction of the step size value to the output intensity of each light source are performed consecutively as opposed to adding the step size value to the output intensity of each light source and then subtracting the step size value from each light source. In other implementations, subtraction of the step size value is performed before the addition of the step size value. Additionally or alternatively, the step size value varies between the addition and subtraction or from light source to light source based on, for example, initial intensity values, a calculated distance, or another feedback criterion.

Figure 27:
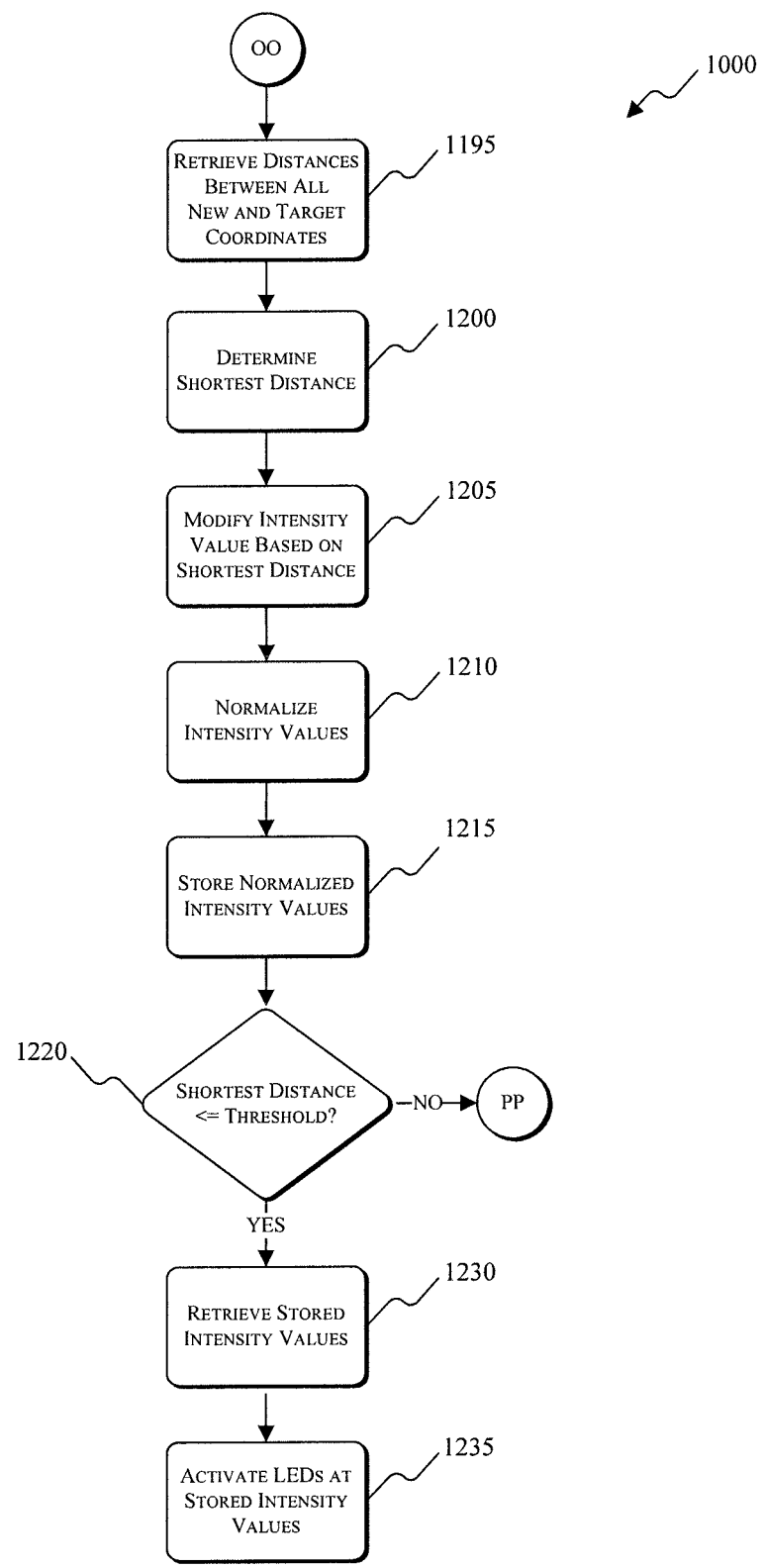

With reference to FIG. 27, after the step size value has been added to and subtracted from the stored intensity values for each of the light sources, the stored distances associated with total light fixture output for each of the modified intensity values are retrieved or accessed from memory (step 1195). The retrieved distances are then compared to one another to determine the shortest distance (step 1200). The shortest distance value corresponds to the set of output intensity values that resulted in the least amount of error (i.e., the addition or subtraction of the step size value that resulted in the most beneficial change in the output of the light fixture). After the shortest distance has been identified, the stored output intensity values are modified (step 1205) to correspond to the output intensity values that produced the shortest distance. For example, the step size value is added to or subtracted from a single output intensity value. After the step size value has been added to or subtracted from the output intensity value, the output intensity values of each of the light sources are normalized (step 1210), as previously described.

The new output intensity values corresponding to that light sources are then stored in memory (step 1215). The shortest distance is compared to the threshold value (step 1220). Because the normalization described above modified the output intensities of the light sources by the same amount (e.g., the same percentage), the ratios of the light source intensities remain the same. As such, the shortest distance that was determined at step 1200 remains unchanged and does not need to be recalculated following the normalization of step 1210. As described above, the threshold value is, for example, a distance value, a percent-error value, or the like. If the distance is not less than or equal to the threshold value, the process 1000 proceeds to section PP shown in and described with respect to FIG. 23, where the new intensity values are retrieved from memory (step 1225) and a step size value is again added to and subtracted from the output intensity values. If the distance is less than the threshold value, the new light source intensity values are retrieved or accessed from memory (step 1230), and the light sources are driven or activated at the stored output intensity values (step 1235).

When the light sources are driven at step 1235, the output of the light fixture corresponds to the desired metamer of the target color that is based on the user modifications to one or more of the light source output intensity values. However, it is possible that the desired metamer cannot be produced by the light fixture. For example, the user requests a change in spectral content that requires a combination of light source output intensity values that are outside of the gamut of the light fixture. In such an instance, the light fixture, or a controller connected to the light fixture, determines that the desired output or metamer cannot be produced and generates an error signal indicative of the inability to produce the desired metamer. The user can then be presented with visual feedback (e.g., an illuminated LED, an error message, etc.), audible feedback, or the like that is based on the error signal and that indicates the desired metamer could not be produced. In some implementations, the process 1000 determines that the desired metamer cannot be produced after a predetermined number of iterations, a predetermined period of time without determining a solution, or the like.

Thus, the invention provides, among other things, systems and methods for controlling the spectral content of an output of a light fixture. Various features and advantages of the invention are set forth in the following claims.

What is claimed is:

1. A method of controlling the output of a light fixture, the light fixture including four or more light sources, the method comprising:
    identifying a first output value for each of the four or more light sources based on a target color;
    driving the four or more light sources at the first output value for each of the four or more light sources to produce the output of the light fixture, the output of the light fixture substantially corresponding to the target color and having a first spectral content;
    receiving a modification signal associated with a modification to the first output value of at least one of the four or more light sources, the modification signal corresponding to a change in the first spectral content;
    identifying a second output value for each of the four or more light sources based on the modification signal; and
    driving the four or more light sources at the second output value for each of the four or more light sources to produce the output of the light fixture, the output of the light fixture substantially corresponding to the target color and having a second spectral content that is different from the first spectral content.

2. The method of claim 1, further comprising normalizing the second output value for each of the four or more light sources prior to driving the four or more light sources at the second output value for each of the four or more light sources.

3. The method of claim 1, further comprising determining whether the target color can be produced based on the modification signal.

4. The method of claim 3, further comprising generating an error signal if the target color cannot be produced based on the modification signal.

5. The method of claim 1, wherein the modification signal is generated in response to a manual user input.

6. The method of claim 5, wherein the manual user input corresponds to an increase or decrease in the first output value of the at least one of the four or more light sources.

7. The method of claim 6, wherein the increase or decrease in the first output value of the at least one of the four or more light sources is directly related to the second control value for the at least one of the four or more light sources.

8. A method of controlling the output of a light fixture, the light fixture including a first light source, a second light source, a third light source, and a fourth light source, the method comprising:
    automatically identifying, based on a target color, a first output value for the first light source, a first output value for the second light source, a first output value for the third light source, and a first output value for the fourth light source;
    driving the first light source at the first output value for the first light source, the second light source at the first output value for the second light source, the third light source at the first output value for the third light source, and the fourth light source at the first output value for the fourth light source to produce the output of the light fixture, the output of the light fixture substantially corresponding to the target color and having a first spectral content;
    receiving a modification signal associated with a modified first output value for the first light source, the modified first output value for the first light source corresponding to a change in the first spectral content;
    automatically identifying, based on the target color, a second output value for the second light source, a second output value for the third light source, and a second output value for the fourth light source; and driving the first light source based on the modified first output value for the first light source, the second light source at the second output value for the second light source, the third light source at the second output value for the third light source, and the fourth light source at the second output value for the fourth light source to produce the output of the light fixture, the output of the light fixture substantially corresponding to the target color and having a second spectral content that is different from the first spectral content.

9. The method of claim 8, further comprising normalizing the second output value for the first light source, the second light source, the third light source, and the fourth light source prior to driving the first light source, the second light source, the third light source, and the fourth light source.

10. The method of claim 8, further comprising determining whether the target color can be produced based on the modification signal.

11. The method of claim 10, further comprising generating an error signal if the target color cannot be produced based on the modification signal.

12. The method of claim 8, wherein the modification signal is generated in response to a manual user input.

13. The method of claim 12, wherein the manual user input corresponds to an increase or decrease in the first output value of the first light source.

14. The method of claim 13, wherein the increase or decrease in the first output value of the first light source is directly related to the modified control value for the first light source.

15. A system for controlling the output of a light fixture, the system comprising:
    four or more light sources; and
    a controller configured to identify a first output value for each of the four or more light sources based on a target color,
        drive the four or more light sources at the first output value for each of the four or more light sources to produce the output of the light fixture, the output of the light fixture substantially corresponding to the target color and having a first spectral content,
        receive a modification signal associated with a modification to the first output value of at least one of the four or more light sources, the modification signal corresponding to a change in the first spectral content,
        identify a second output value for each of the four or more light sources based on the modification signal, and
        drive the four or more light sources at the second output value for each of the four or more light sources to produce the output of the light fixture, the output of the light fixture substantially corresponding to the target color and having a second spectral content that is different from the first spectral content.

16. The system of claim 15, wherein the controller is further configured to normalize the second output value for each of the four or more light sources prior to driving the four or more light sources at the second output value for each of the four or more light sources.

17. The system of claim 15, wherein the controller is further configured to determine whether the target color can be produced based on the modification signal.

18. The system of claim 17, wherein the controller is further configured to generate an error signal if the target color cannot be produced based on the modification signal.

19. The system of claim 15, further comprising a user control interface configured to receive a manual input corresponding to an increase or decrease in the first output value of the at least one of the four or more light sources.

20. The system of claim 19, wherein the increase or decrease in the first output value of the at least one of the four or more light sources is directly related to the second control value for the at least one of the four or more light sources.

* * * * *